(12) United States Patent
Dageville et al.

(10) Patent No.: US 11,838,293 B2
(45) Date of Patent: *Dec. 5, 2023

(54) PRIVATE DATA EXCHANGE METRICS SHARING

(71) Applicant: Snowflake Inc., Bozeman, MT (US)

(72) Inventors: Benoit Dageville, Foster City, CA (US); Matthew Glickman, Larchmont, NY (US); Christian Kleinerman, Burlingame, CA (US); Prasanna Krishnan, Palo Alto, CA (US); Justin Langseth, Kailua, HI (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,901

(22) Filed: Feb. 7, 2023

(65) Prior Publication Data

US 2023/0188530 A1 Jun. 15, 2023

Related U.S. Application Data

(63) Continuation of application No. 17/894,817, filed on Aug. 24, 2022, now Pat. No. 11,595,399, which is a
(Continued)

(51) Int. Cl.
*H04L 9/40* (2022.01)
*G06F 16/2455* (2019.01)
(Continued)

(52) U.S. Cl.
CPC ........ *H04L 63/102* (2013.01); *G06F 16/2455* (2019.01); *G06F 21/606* (2013.01);
(Continued)

(58) Field of Classification Search
CPC .................. H04L 67/1097; G06F 16/2455
See application file for complete search history.

(56) References Cited

U.S. PATENT DOCUMENTS 5,978,787 A 11/1999 Wong et al.
6,105,027 A 8/2000 Schneider et al.
(Continued)

OTHER PUBLICATIONS

Chen, Lve; Liu, Chuanchang. Mobile-oriented multimedia sharing system with multi-activity support. Proceedings of 2012 2nd International Conference on Computer Science and Network Technology (Dec. 29-31, 2012), pp. 1185-1189. https://ieeexplore.ieee.org/stamp/stamp.jsp?tp=&arnumber=6526136.
(Continued)

*Primary Examiner* — Nam T Tran
(74) *Attorney, Agent, or Firm* — Womble Bond Dickinson (US) LLP

(57) ABSTRACT

Providing access to consumer information on a private data exchange is described. In an example, privileges are assigned to a share object, granting access to consumer information obtained from a query against data referenced by a data listing of a data exchange. The data exchange comprises one or more data listings provided by one or more data providers. In response to the share object being added to a list of consumed share objects of a data provider that provided the data listing, a database is generated that references the consumer information based on the share object. Access to the database is granted to the data provider that provided the data listing.

27 Claims, 15 Drawing Sheets

Related U.S. Application Data continuation of application No. 17/666,473, filed on Feb. 7, 2022, now Pat. No. 11,470,089, which is a continuation of application No. 16/746,764, filed on Jan. 17, 2020, now Pat. No. 11,265,328.

(60) Provisional application No. 62/899,571, filed on Sep. 12, 2019.

(51) Int. Cl.

| | |
|---|---|
| *H04L 41/22* | (2022.01) |
| *H04L 67/1097* | (2022.01) |
| *H04L 51/212* | (2022.01) |
| *G06F 21/60* | (2013.01) |
| *G06F 21/62* | (2013.01) |

(52) U.S. Cl.
CPC .......... *G06F 21/6218* (2013.01); *H04L 41/22* (2013.01); *H04L 51/212* (2022.05); *H04L 63/101* (2013.01); *H04L 67/1097* (2013.01)

(56) References Cited

U.S. PATENT DOCUMENTS

| | | | |
|---|---|---|---|
| 6,408,336 | B1 | 6/2002 | Schneider et al. |
| 6,732,100 | B1 | 5/2004 | Brodersen et al. |
| 7,783,665 | B1 | 8/2010 | Tormasov et al. |
| 7,945,652 | B2 | 5/2011 | Tsao et al. |
| 8,832,055 | B1 | 9/2014 | Zwicky et al. |
| 8,931,036 | B1 | 1/2015 | Cherukumudi et al. |
| 9,354,782 | B2 | 5/2016 | Gorod |
| 9,774,586 | B1 | 9/2017 | Roche et al. |
| 9,817,563 | B1 | 11/2017 | Stokes et al. |
| 10,642,857 | B2 | 5/2020 | Labian |
| 2002/0111816 | A1 | 8/2002 | Lortscher et al. |
| 2006/0047780 | A1 | 3/2006 | Patnude |
| 2007/0162377 | A1 | 7/2007 | Williams |
| 2008/0028436 | A1 | 1/2008 | Hannel et al. |
| 2008/0172366 | A1 | 7/2008 | Hannel et al. |
| 2008/0201339 | A1 | 8/2008 | McGrew et al. |
| 2009/0030906 | A1 | 1/2009 | Doshi et al. |
| 2010/0280959 | A1 | 11/2010 | Stone et al. |
| 2011/0231443 | A1 | 9/2011 | Hannel et al. |
| 2012/0323750 | A1 | 12/2012 | Sivaramakrishnan et al. |
| 2014/0032265 | A1 | 1/2014 | Paprocki |
| 2014/0108258 | A1 | 4/2014 | Williams |
| 2014/0280492 | A1 | 9/2014 | Yang et al. |
| 2014/0282828 | A1 | 9/2014 | Stuntebeck |
| 2015/0381628 | A1 | 12/2015 | Steinberg et al. |
| 2016/0203157 | A1 | 7/2016 | Kuruganti et al. |
| 2016/0275160 | A1 | 9/2016 | Motivala et al. |
| 2017/0041296 | A1 | 2/2017 | Ford et al. |
| 2017/0093753 | A1 | 3/2017 | Summers et al. |
| 2017/0099293 | A1 | 4/2017 | Tan |
| 2017/0126686 | A1 | 5/2017 | Totov |
| 2018/0025174 | A1 | 1/2018 | Mathur et al. |
| 2018/0091517 | A1 | 3/2018 | Fury Christ et al. |
| 2018/0137139 | A1 | 5/2018 | Bangalore et al. |
| 2018/0196955 | A1 | 7/2018 | Dageville et al. |
| 2018/0375886 | A1 | 12/2018 | Kirti et al. |
| 2019/0028514 | A1 | 1/2019 | Barboi et al. |
| 2019/0243621 | A1 | 8/2019 | Gass et al. |
| 2019/0243629 | A1 | 8/2019 | Gass et al. |

OTHER PUBLICATIONS

James, John R. et al. Seeing the Real World: Sharing Protected Data in Real Time. 012 45th Hawaii International Conference on System Sciences (Jan. 4-7, 2012), pp. 2357-2365. https://ieeexplore.ieee.org/stamp/stamp.sp?tp=&arnumber=6149300.

International Searching Authority, International Search Report and Written Opinion for PCT/US20/43337, dated Nov. 23, 2020.

Wong, Run et al. An authorization system for database grid. International Conference on Next Generation Web Services Practices ( NWeSP'05). https://ieeexplore.ieee.org/stamp/stamp.jsp?tp=&arnumber=1592441 (Year: 2005).

Inamdar, Mohammed Suhel; Tekeoglu, Ali. Security Analysis of Open Source Network Access Control in Virtual Networks. 2018 32nd International Conference on Advanced Information Networking and Applications Workshops (WAINA). https://ieeexplore.ieee.org/stamp/stamp.jsp?tp=&arnumber=8418116 (Year: 2018).

Squicciarini, Anna Cinzia et al. Access Control Strategies for Virtualized Environments in Grid Computing 4 Systems. 11th IEEE International Workshop on Future Trends of Distributed Computing Systems (FTDCS'07). https://ieeexplore.ieee.org/stamp/ stamp.jsp?tp=&arnumber=4144613 (Year: 2007).

Dageville et al., "The Snowflake Elastic Data Warehouse", Snowflake Computing, 2016, 12 pages.

Supplementary European Search Report in related EP Application 20863942.7 dated Sep. 6, 2023, pp. 1-12.

Ram Krishnan et al., "Group-Centric Secure Information-Sharing Models for Isolated Groups," ACM Transactions on Information and System Security, ACM, Nov. 1, 2011, pp. 1-23, vol. 14, No. 3, New York, NY.

PRIVATE DATA EXCHANGE METRICS SHARING

CROSS REFERENCE TO RELATED APPLICATIONS

This application is a continuation of co-pending U.S. application Ser. No. 17/894,817, filed Aug. 24, 2022, entitled "PRIVATE DATA EXCHANGE METRICS SHARING," which is a continuation of U.S. application Ser. No. 17/666,473, filed Feb. 7, 2022, entitled "PRIVATE DATA EXCHANGE METRICS SHARING," now issued as U.S. Pat. No. 11,470,089, which is a continuation of U.S. application Ser. No. 16/746,764, filed Jan. 17, 2020, entitled "PRIVATE DATA EXCHANGE METRICS SHARING," now issued as U.S. Pat. No. 11,265,328, which claims the benefit of U.S. Provisional Application No. 62/899,571, filed Sep. 12, 2019, and these applications are hereby incorporated by reference herein in their entirety.

TECHNICAL FIELD

The present disclosure relates to resource management systems and methods that manage data storage and computing resources.

BACKGROUND

Databases are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
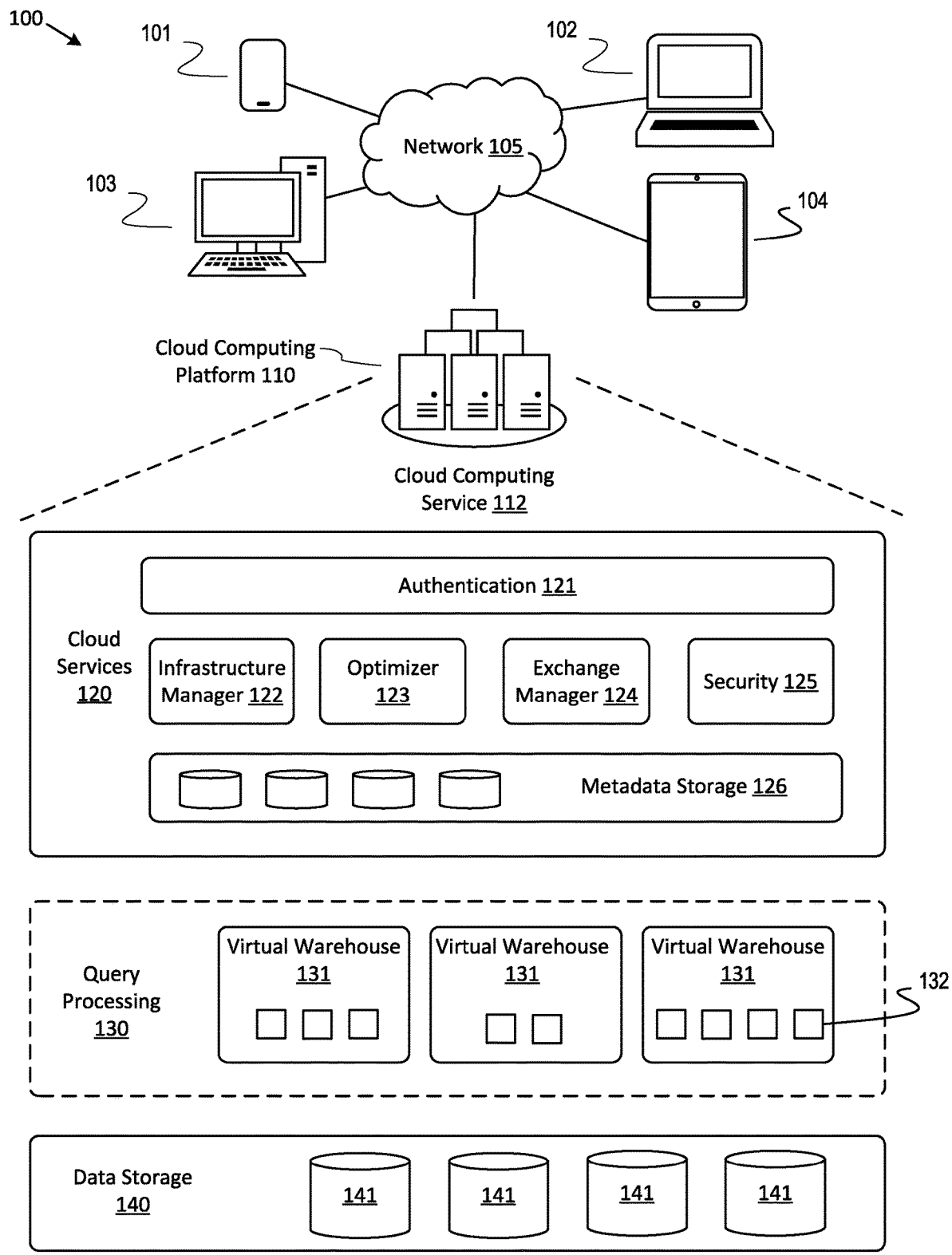
FIG. 1A is a block diagram depicting an example computing environment in which the methods disclosed herein may be implemented.

Data providers often have data assets that are cumbersome to share. A data asset may be data that is of interest to another entity. For example, a large online retail company may have a data set that includes the purchasing habits of millions of customers over the last ten years. This data set may be large. If the online retailer wishes to share all or a portion of this data with another entity, the online retailer may need to use old and slow methods to transfer the data, such as a file-transfer-protocol (FTP), or even copying the data onto physical media and mailing the physical media to the other entity. This has several disadvantages. First, it is slow. Copying terabytes or petabytes of data can take days. Second, once the data is delivered, the sharer cannot control what happens to the data. The recipient can alter the data, make copies, or share it with other parties. Third, the only entities that would be interested in accessing such a large data set in such a manner are large corporations that can afford the complex logistics of transferring and processing the data as well as the high price of such a cumbersome data transfer. Thus, smaller entities (e.g., "mom and pop" shops) or even smaller, more nimble cloud-focused startups are often priced out of accessing this data, even though the data may be valuable to their businesses. This may be because raw data assets are generally too unpolished and full of potentially sensitive data to just outright sell to other companies. Data cleaning, de-identification, aggregation, joining, and other forms of data enrichment need to be performed by the owner of data before it is shareable with another party. This is time-consuming and expensive. Finally, it is difficult to share data assets with many entities because traditional data sharing methods do not allow scalable sharing for the reasons mentioned above. Traditional sharing methods also introduce latency and delays in terms of all parties having access to the most recently updated data.

A private data exchange may allow data providers to more easily and securely share their data assets with other entities. A private data exchange can be under the data provider's brand, and the data provider may control who can gain access to it. The private data exchange may be for internal use only, or may also be opened to customers, partners, suppliers, or others. The data provider may control what data assets are listed as well as control who has access to which sets of data. This allows for a seamless way to discover and share data both within a data provider's organization and with its business partners.

The private data exchange may be facilitated by a cloud computing service such as SNOWFLAKE, and allows data providers to offer data assets directly from their own online domain (e.g., website) in a private online marketplace with their own branding. The private data exchange may provide a centralized, managed hub for an entity to list internally or externally-shared data assets, inspire data collaboration, and also to maintain data governance and to audit access. With the private data exchange, data providers may be able to share data without copying it between companies. Data providers may invite other entities to view their data listings, control which data listings appear in their private online marketplace, control who can access data listings and how others can interact with the data assets connected to the listings. This may be thought of as a "walled garden" marketplace, in which visitors to the garden must be approved and access to certain listings may be limited.

As an example, Company A may be a consumer data company that has collected and analyzed the consumption habits of millions of individuals in several different categories. Their data sets may include data in the following categories: online shopping, video streaming, electricity consumption, automobile usage, internet usage, clothing purchases, mobile application purchases, club memberships, and online subscription services. Company A may desire to offer these data sets (or subsets or derived products of these data sets) to other entities. For example, a new clothing brand may wish to access data sets related to consumer clothing purchases and online shopping habits. Company A may support a page on its website that is or functions substantially similar to a private data exchange, where a data consumer (e.g., the new clothing brand) may browse, explore, discover, access and potentially purchase data sets directly from Company A. Further, Company A may control: who can enter the private data exchange, the entities that may view a particular listing, the actions that an entity may take with respect to a listing (e.g., view only), and any other suitable action. In addition, a data provider may combine its own data with other data sets from, e.g., a public data exchange, and create new listings using the combined data.

A private data exchange may be an appropriate place to discover, assemble, clean, and enrich data to make it more monetizable. A large company on a private data exchange may assemble data from across its divisions and departments, which could become valuable to another company. In addition, participants in a private ecosystem data exchange may work together to join their datasets together to jointly create a useful data product that any one of them alone would not be able to produce. Once these joined datasets are created, they may be listed on a public or private data exchange.

The systems and methods described herein provide a flexible and scalable data warehouse using a new data processing platform. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database, and any type of data storage and retrieval platform, using any data storage architecture and using any language to store and retrieve data within the data storage and retrieval platform. The systems and methods described herein further provide a multi-tenant system that supports isolation of computing resources and data between different customers/clients and between different users within the same customer/client.

FIG. 1A is a block diagram of an example computing environment 100 in which the systems and methods disclosed herein may be implemented. In particular, a cloud computing platform 110 may be implemented, such as AMAZON WEB SERVICES™ (AWS), MICROSOFT AZURE™, GOOGLE CLOUD™, or the like. As known in the art, a cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g., data management and access) and analysis functions (e.g., SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as AMAZON S3 to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution within elastic clusters of virtual machines, referred to herein as virtual warehouses or data warehouses. Thus, query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to the user's needs. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times. For example, a data load which takes fifteen hours on a system with four nodes might take only two hours with thirty-two nodes.

Cloud services 120 may be a collection of services that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security engine 125, and metadata storage 126.

Figure 1B:
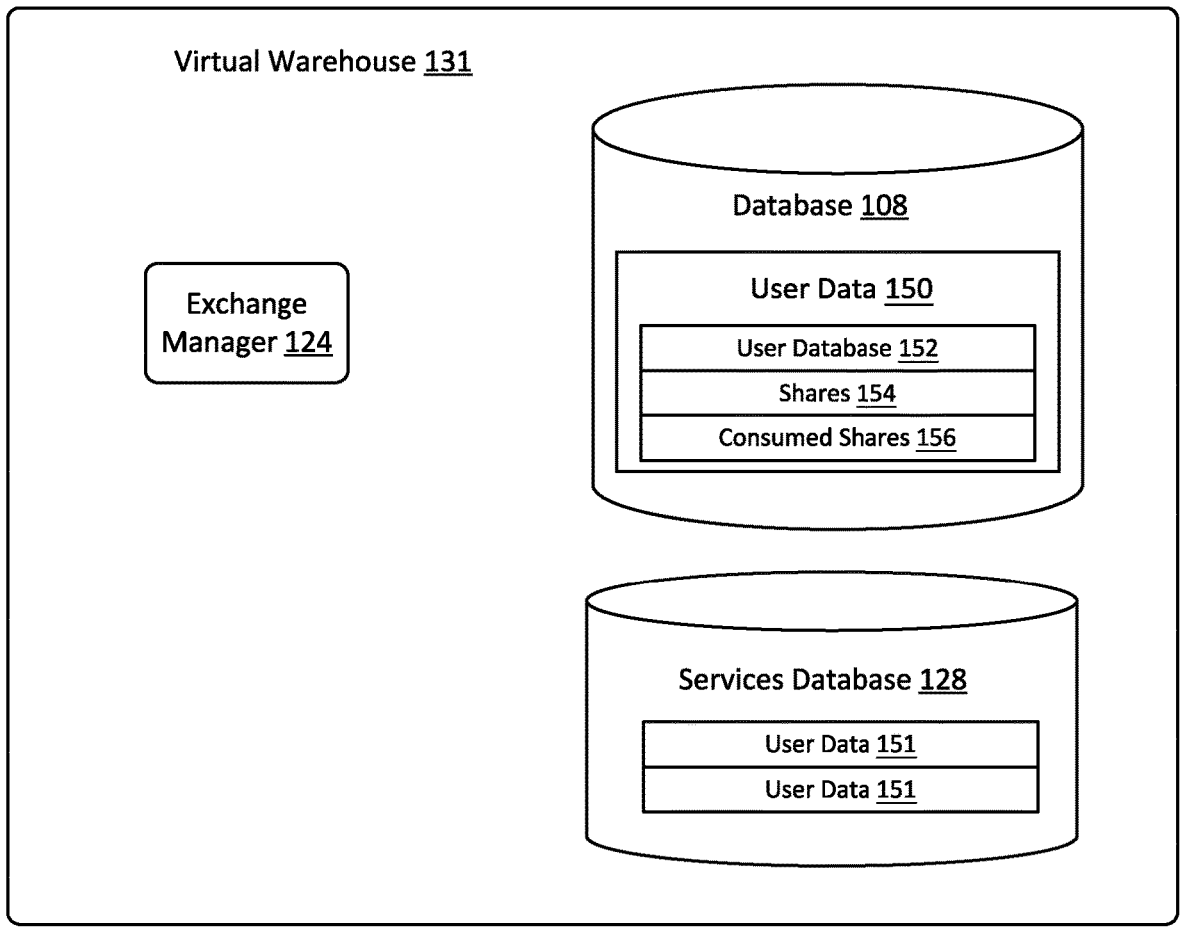
FIG. 1B is a block diagram illustrating an example virtual warehouse.

FIG. 1B is a block diagram illustrating an example virtual warehouse 131. The exchange manager 124 may facilitate the sharing of data between data providers and data consumers, using, for example, a private data exchange. For example, cloud computing service 112 may manage the storage and access of a database 108. The database 108 may include various instances of user data 150 for different users, e.g., different enterprises or individuals. The user data may include a user database 152 of data stored and accessed by that user. The user database 152 may be subject to access controls such that only the owner of the data is allowed to change and access the database 152 upon authenticating with the cloud computing service 112. For example, data may be encrypted such that it can only be decrypted using decryption information possessed by the owner of the data. Using the exchange manager 124, specific data from a user database 152 that is subject to these access controls may be shared with other users in a controlled manner according to the methods disclosed herein. In particular, a user may specify shares 154 that may be shared in a public or private data exchange in an uncontrolled manner or shared with specific other users in a controlled manner as described above. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. When data is shared, no data is copied or transferred between users. Sharing is accomplished through the cloud services 120 of cloud computing service 112.

Sharing data may be performed when a data provider creates a share of a database in the data provider's account and grants access to particular objects (e.g., tables, secure views, and secure user-defined functions (UDFs)). Then a read-only database may be created using information provided in the share. Access to this database may be controlled by the data provider.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data, but the actual shared data is not accessible by the data consumer (e.g., recipient of the share). A secure join may be performed as described in U.S. application Ser. No. 16/368,339, filed Mar. 18, 2019.

User devices 101-104, such as laptop computers, desktop computers, mobile phones, tablet computers, cloud-hosted computers, cloud-hosted serverless processes, or other computing processes or devices may be used to access the virtual warehouse 131 or cloud service 120 by way of a network 105, such as the Internet or a private network.

In the description below, actions are ascribed to users, particularly consumers and providers. Such actions shall be understood to be performed with respect to devices 101-104 operated by such users. For example, notification to a user may be understood to be a notification transmitted to devices 101-104, an input or instruction from a user may be understood to be received by way of the user's devices 101-104, and interaction with an interface by a user shall be understood to be interaction with the interface on the user's devices 101-104. In addition, database operations (joining, aggregating, analysis, etc.) ascribed to a user (consumer or provider) shall be understood to include performing of such actions by the cloud computing service 112 in response to an instruction from that user.

Figure 2:
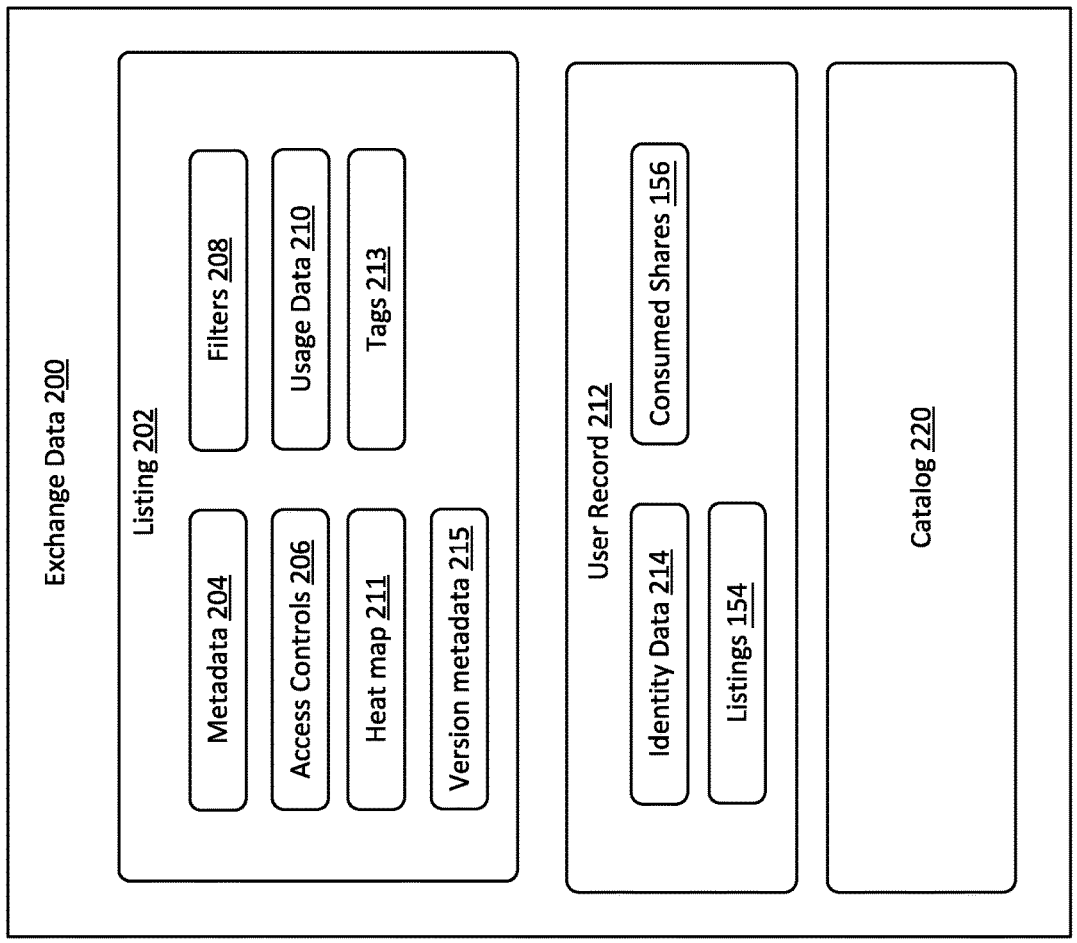
FIG. 2 is a schematic block diagram of data that may be used to implement a public or private data exchange in accordance with an embodiment of the present invention.

FIG. 2 is a schematic block diagram of data that may be used to implement a public or private data exchange in accordance with an embodiment of the present invention. The exchange manager 124 may operate with respect to some or all of the illustrated exchange data 200, which may be stored on the platform executing the exchange manager 124 (e.g., the cloud computing platform 110) or at some other location. The exchange data 200 may include a plurality of listings 202 describing data that is shared by a first user ("the provider"). The listings 202 may be listings in a private data exchange or in a public data exchange. The access controls, management, and governance of the listings may be similar for both a public data exchange and a private data exchange.

A listing 202 may include metadata 204 describing the shared data. The metadata 204 may include some or all of the following information: an identifier of the sharer of the shared data, a URL associated with the sharer, a name of the share, a name of tables, a category to which the shared data belongs, an update frequency of the shared data, a catalog of the tables, a number of columns and a number of rows in each table, as well as name for the columns. The metadata 204 may also include examples to aid a user in using the data. Such examples may include sample tables that include a sample of rows and columns of an example table, example queries that may be run against the tables, example views of an example table, example visualizations (e.g., graphs, dashboards) based on a table's data. Other information included in the metadata 204 may be metadata for use by business intelligence tools, text description of data contained in the table, keywords associated with the table to facilitate searching, a link (e.g., URL) to documentation related to the shared data, and a refresh interval indicating how frequently the shared data is updated along with the date the data was last updated.

The listing 202 may include access controls 206, which may be configurable to any suitable access configuration. For example, access controls 206 may indicate that the shared data is available to any member of the private exchange without restriction (an "any share" as used elsewhere herein). The access controls 206 may specify a class of users (members of a particular group or organization) that are allowed to access the data and/or see the listing. The access controls 206 may specify that a "point-to-point" share (see discussion of FIG. 4) in which users may request access but are only allowed access upon approval of the provider. The access controls 206 may specify a set of user identifiers of users that are excluded from being able to access the data referenced by the listing 202.

Figure 6:
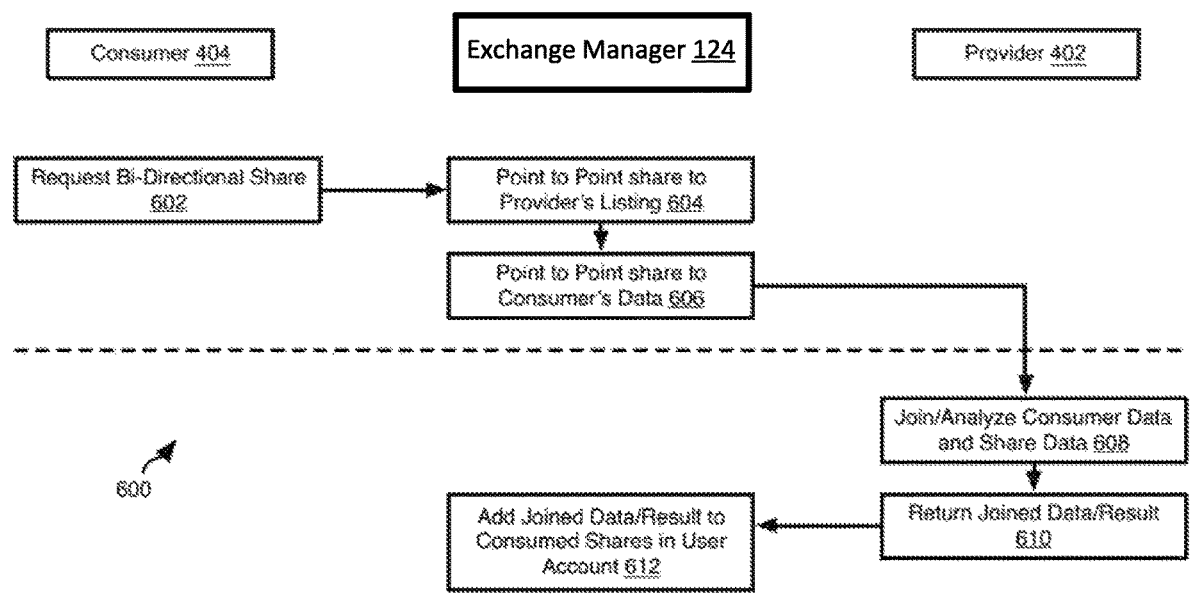
FIG. 6 is a process flow diagram of a method for performing bi-directional shares in a data exchange in accordance with an embodiment of the present invention.

Note that some listings 202 may be discoverable by users without further authentication or access permissions whereas actual accesses are only permitted after a subsequent authentication step (see discussion of FIGS. 4 and 6). The access controls 206 may specify that a listing 202 is only discoverable by specific users or classes of users.

Note also that a default function for listings 202 is that the data referenced by the share is not exportable by the consumer. Alternatively, the access controls 206 may specify that this is not permitted. For example, access controls 206 may specify that secure operations (secure joins and secure functions as discussed below) may be performed with respect to the shared data such that viewing and exporting of the shared data is not permitted.

In some embodiments, once a user is authenticated with respect to a listing 202, a reference to that user (e.g., user identifier of the user's account with the virtual warehouse 131) is added to the access controls 206 such that the user will subsequently be able to access the data referenced by the listing 202 without further authentication.

The listing 202 may define one or more filters 208. For example, the filters 208 may define specific identity data 214 of users that may view references to the listing 202 when browsing the catalog 220. The filters 208 may define a class of users (users of a certain profession, users associated with a particular company or organization, users within a particular geographical area or country) that may view references to the listing 202 when browsing the catalog 220. In this manner, a private exchange may be implemented by the exchange manager 124 using the same components. In some embodiments, an excluded user that is excluded from accessing a listing 202, i.e., adding the listing 202 to the consumed shares 156 of the excluded user, may still be permitted to view a representation of the listing when browsing the catalog 220 and may further be permitted to request access to the listing 202 as discussed below. Requests to access a listing by such excluded users and other users may be listed in an interface presented to the provider of the listing 202. The provider of the listing 202 may then view demand for access to the listing and choose to expand the filters 208 to permit access to excluded users or classes of excluded users (e.g., users in excluded geographic regions or countries).

Filters 208 may further define what data may be viewed by a user. In particular, filters 208 may indicate that a user that selects a listing 202 to add to the consumed shares 156 of the user is permitted to access the data referenced by the listing but only a filtered version that only includes data associated with the identity data 214 of that user, associated with that user's organization, or specific to some other classification of the user. In some embodiments, a private exchange is by invitation: users invited by a provider to view listings 202 of a private exchange are enabled to do by the exchange manager 124 upon communicating acceptance of an invitation received from the provider.

In some embodiments, a listing 202 may be addressed to a single user. Accordingly, a reference to the listing 202 may be added to a set of "pending shares" that is viewable by the user. The listing 202 may then be added to a group of shares of the user upon the user communicating approval to the exchange manager 124.

The listing 202 may further include usage data 210. For example, the cloud computing service 112 may implement a credit system in which credits are purchased by a user and are consumed each time a user runs a query, stores data, or uses other services implemented by the cloud computing service 112. Accordingly, usage data 210 may record an amount of credits consumed by accessing the shared data. Usage data 210 may include other data such as a number of queries, a number of aggregations of each type of a plurality of types performed against the shared data, or other usage statistics. In some embodiments, usage data for a listing 202 or multiple listings 202 of a user is provided to the user in the form of a shared database, i.e. a reference to a database including the usage data is added by the exchange manager 124 to the consumed shares of the user.

The listing 202 may also include a heat map 211, which may represent the geographical locations in which users have clicked on that particular listing. The cloud computing service 112 may use the heat map to make replication decisions or other decisions with the listing. For example, a private data exchange may display a listing that contains weather data for Georgia, USA. The heat map 211 may indicate that many users in California are selecting the listing to learn more about the weather in Georgia. In view of this information, the cloud computing service 112 may replicate the listing and make it available in a database whose servers are physically located in the western United States, so that consumers in California may have access to the data. In some embodiments, an entity may store its data on servers located in the western United States. A particular listing may be very popular to consumers. The cloud computing service 112 may replicate that data and store it in servers located in the eastern United States, so that consumers in the Midwest and on the East Coast may also have access to that data.

The listing 202 may also include one or more tags 213. The tags 213 may facilitate simpler sharing of data contained in one or more listings. As an example, a large company may have a human resources (HR) listing containing HR data for its internal employees on a private data exchange. The HR data may contain ten types of HR data (e.g., employee number, selected health insurance, current retirement plan, job title, etc.). The HR listing may be accessible to 100 people in the company (e.g., everyone in the HR department). Management of the HR department may wish to add an eleventh type of HR data (e.g., an employee stock option plan). Instead of manually adding this to the HR listing and granting each of the 100 people access to this new data, management may simply apply an HR tag to the new data set and that can be used to categorize the data as HR data, list it along with the HR listing, and grant access to the 100 people to view the new data set.

The listing 202 may also include version metadata 215. Version metadata 215 may provide a way to track how the datasets are changed. This may assist in ensuring that the data that is being viewed by one entity is not changed prematurely. For example, if a company has an original data set and then releases an updated version of that data set, the updates could interfere with another user's processing of that data set, because the update could have different formatting, new columns, and other changes that may be incompatible with the current processing mechanism of the recipient user. To remedy this, the cloud computing service 112 may track version updates using version metadata 215. The cloud computing service 112 may ensure that each data consumer accesses the same version of the data until they accept an updated version that will not interfere with current processing of the data set.

The exchange data 200 may further include user records 212. The user record 212 may include data identifying the user associated with the user record 212, e.g. an identifier (e.g., warehouse identifier) of a user having user data 151 in service database 128 and managed by the virtual warehouse 131.

The user record 212 may list shares associated with the user, e.g., reference listings 154 created by the user. The user record 212 may list shares consumed by the user, e.g., reference listings 202 created by another user and that have been associated to the account of the user according to the methods described herein. For example, a listing 202 may have an identifier that will be used to reference it in the shares or consumed shares of a user record 212.

The exchange data 200 may further include a catalog 220. The catalog 220 may include a listing of all available listings 202 and may include an index of data from the metadata 204 to facilitate browsing and searching according to the methods described herein. In some embodiments, listings 202 are stored in the catalog in the form of JavaScript Object Notation (JSON) objects.

Note that where there a multiple instances of the virtual warehouse 131 on different cloud computing platforms, the catalog 220 of one instance of the virtual warehouse 131 may store listings or references to listings from other instances on one or more other cloud computing platforms 110. Accordingly, each listing 202 may be globally unique (e.g., be assigned a globally unique identifier across all of the instances of the virtual warehouse 131). For example, the instances of the virtual warehouses 131 may synchronize their copies of the catalog 220 such that each copy indicates the listings 202 available from all instances of the virtual warehouse 131. In some instances, a provider of a listing 202 may specify that it is to be available on only on specified one or more computing platforms 110.

In some embodiments, the catalog 220 is made available on the Internet such that it is searchable by a search engine such as BING or GOOGLE. The catalog may be subject to a search engine optimization (SEO) algorithm to promote its visibility. Potential consumers may therefore browse the catalog 220 from any web browser. The exchange manager 124 may expose uniform resource locators (URLs) linked to each listing 202. This URL may be searchable and can be shared outside of any interface implemented by the exchange manager 124. For example, the provider of a listing 202 may publish the URLs for its listings 202 in order to promote usage of its listing 202 and its brand.

Figure 3:
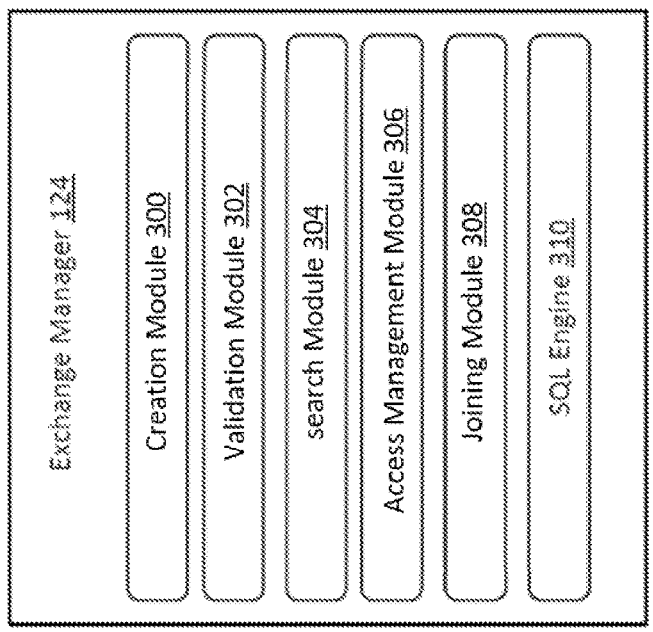
FIG. 3 is a schematic block diagram of components for implementing a data exchange in accordance with an embodiment of the present invention.

FIG. 3 illustrates various components 300-310 that may be included in the exchange manager 124. A creation module 300 may provide an interface for creating listings 202. For example, a webpage interface to the virtual warehouse 131 that enables a user on a devices 101-104 to select data, e.g., a specific table in user data 150 of the user, for sharing and enter values defining some or all of the metadata 204, access controls 206, and filters 208. In some embodiments, creation may be performed by a user by way of SQL commands in an SQL interpreter executing on the cloud computing platform 110 and accessed by way of a webpage interface on a user device 101-104. A validation module 302 may validate information provided by a provider when attempting to create a listing 202. Note that in some embodiments the actions ascribed to the validation module 302 may be performed by a human reviewing the information provided by the provider. In other embodiments, these actions are performed automatically. The validation module 302 may perform, or facilitate performing by a human operator of various functions. These functions may include verifying that the metadata 204 is consistent with the shared data to which it references, verifying that the shared data referenced by metadata 204 is not pirated data, personal identification information (PII), personal health information (PHI) or other data for which sharing is undesirable or illegal. The validation module 302 may also facilitate the verification that the data has been updated within a threshold period of time (e.g., within the last twenty-four hours). The validation module 302 may also facilitate verifying that the data is not static or not available from other static public sources. The validation module 302 may also facilitate verifying that the data is more than merely a sample (e.g., that the data is sufficiently complete to be useful). For example, geographically limited data may be undesirable whereas an aggregation of data that is not otherwise limited may still be of use.

The exchange manager 124 may include a search module 304. The search module 304 may implement a webpage interface that is accessible by a user on a user devices 101-104 in order to invoke searches for search strings with respect to the metadata in the catalog 220, receive responses to searches, and select references to listings 202 in search results for adding to the consumed shares 156 of the user record 212 of the user performing the search. In some embodiments, searches may be performed by a user by way of SQL commands in an SQL interpreter executing on the cloud computing platform 110 and accessed by way of a webpage interface on user devices 101-104. For example, searching for shares may be performed by way of SQL queries against the catalog 220 within the SQL engine 310 discussed below.

The search module 304 may further implement a recommendation algorithm. For example, the recommendation algorithm could recommend other listing 202 for a user based on other listings in the user's consumed shares 156 or formerly in the user's consumed shares. Recommendations could be based on logical similarity: one source of weather data leads to a recommendation for a second source of weather data. Recommendations could be based on dissimilarity: one listing is for data in one domain (geographic area, technical field, etc.) results in a listing for a different domain to facilitate complete coverage by the user's analysis (different geographic area, related technical field, etc.).

The exchange manager 124 may include an access management module 306. As described above, a user may add a listing 202. This may require authentication with respect to the provider of the listing 202. Once a listing 202 is added to the consumed shares 156 of the user record 212 of a user, the user may be either (a) required to authenticate each time the data referenced by the listing 202 is accessed or (b) be automatically authenticated and allowed to access the data once the listing 202 is added. The access management module 306 may manage automatic authentication for subsequent access of data in the consumed shares 156 of a user in order to provide seamless access of the shared data as if it was part of the user data 150 of that user. To that end, the access management module 306 may access controls 206 of the listing 202, certificates, tokens, or other authentication material in order to authenticate the user when performing accesses to shared data.

The exchange manager 124 may include a joining module 308. The joining module 308 manages the integration of shared data referenced by consumed shares 156 of a user with one another, i.e., shared data from different providers, and with a user database 152 of data owned by the user. In particular, the joining module 308 may manage the execution of queries and other computation functions with respect to these various sources of data such that their access is transparent to the user. The joining module 308 may further manage the access of data to enforce restrictions on shared data, e.g. such that analysis may be performed and the results of the analysis displayed without exposing the underlying data to the consumer of the data where this restriction is indicated by the access controls 206 of a listing 202.

The exchange manager 124 may further include a standard query language (SQL) engine 310 that is programmed to receive queries from a user and execute the query with respect to data referenced by the query, which may include consumed shares 156 of the user and the user data 150 owned by the user. The SQL engine 310 may perform any query processing functionality known in the art. The SQL engine 310 may additionally or alternatively include any other database management tool or data analysis tool known in the art. The SQL engine 310 may define a webpage interface executing on the cloud computing platform 110 through which SQL queries are input and responses to SQL queries are presented Referring to FIG. 4A, the illustrated method 400 may be executed by the exchange manager 124 in order to implement a point-to-point share between a first user ("provider 402") and a second user ("consumer 404").

The method 400 may include the provider entering 406 metadata. This may include a user on devices 101-104 of the provider entering the metadata into fields of a form in a webpage provided by the exchange manager 124. In some embodiments, entering 406 of metadata may be made using SQL commands by way of the SQL engine 310. The items of metadata may include some or all of those discussed above with respect to the metadata 204 of a listing 202. Step 406 may include receiving other data for a listing 202, such as access controls 206 and parameters defining a filter 208.

The provider 402 may then invoke, on the devices 101-104, submission of the form and the data entered. The exchange manager 124 may then verify the metadata 408 and validate the data 410 referenced by the metadata. This may include performing some or all of the actions ascribed to the validation module 302. If the metadata and shared data are not successfully verified 408 and validated 410, the exchange manager 124 may notify the provider 402, such as by means of a notification through the web interface through which the metadata was submitted at step 406.

If the metadata and shared data are not successfully verified 408 and validated 410, the exchange manager 124 may notify the provider 402, such as by way of the web interface through which the metadata was submitted at step 406.

The exchange manager 124 may further create 412 a listing 202 including the data submitted at step 406 and may further create an entry in the catalog 220. For example, keywords, descriptive text, and other items of information in the metadata may be indexed to facilitate searching.

Note that steps 406-412 may be performed by means of an interface provided to the provider 402. Such an interface may include any suitable features including elements for inputting data (e.g., elements 204-210), and elements for generating a data listing. In addition, the interface may include elements to publish or unpublish a data listing to make the listing un-viewable to at least some other users. The interface may also include an element to update versions of the data listing or to roll back to a prior version of the listing or of the metadata associated with the listing. The interface may also include a list of pending requests to add a data listing or to add members to the data exchange. The interface may also include an indication of the number and other non-identifying information related to the data consumers who have accessed a given listing, as well as a representation of usage patterns of the data referenced by a listing by the data consumers of that listing.

Another user acting as a consumer 404 may then browse 414 the catalog. This may include accessing a publicly accessible webpage providing a search interface to the catalog. This webpage may be external to the virtual warehouse 131, i.e., accessible by users that are not logged into the virtual warehouse 131. In other embodiments, only users that are logged in to the virtual warehouse 131 are able to access the search interface. As noted above, browsing of the catalog 220 may be performed using queries to the SQL engine 310 that reference the catalog 220. For example, user devices 101-104 may have a web-based interface to the SQL engine 310 through which queries against the catalog 220 are input by the consumer 404 and transmitted to the SQL engine 310.

In response to the consumer's browsing activities, the exchange manager 124 may display the catalog and perform 416 searches with respect to the catalog to identify listings 202 having metadata corresponding to queries or search strings submitted by the consumer 404. The manner in which this search is performed may be according to any search algorithm known in the art. In the case of an SQL query, the query may be processed according to any approach for processing SQL queries known in the art.

The exchange manager 124 may return results of a search string or SQL query to the consumer's 404 devices 101-104, such as in the form of a listing of references to listings 202 identified according to the search algorithm or processing the SQL query. The listing may include items of metadata or links that the consumer 404 may select to invoke display of metadata. In particular, any of the items of metadata 204 of a listing 202 may be displayed in the listing or linked to by an entry in the listing corresponding to the search record 202.

Figure 4A:
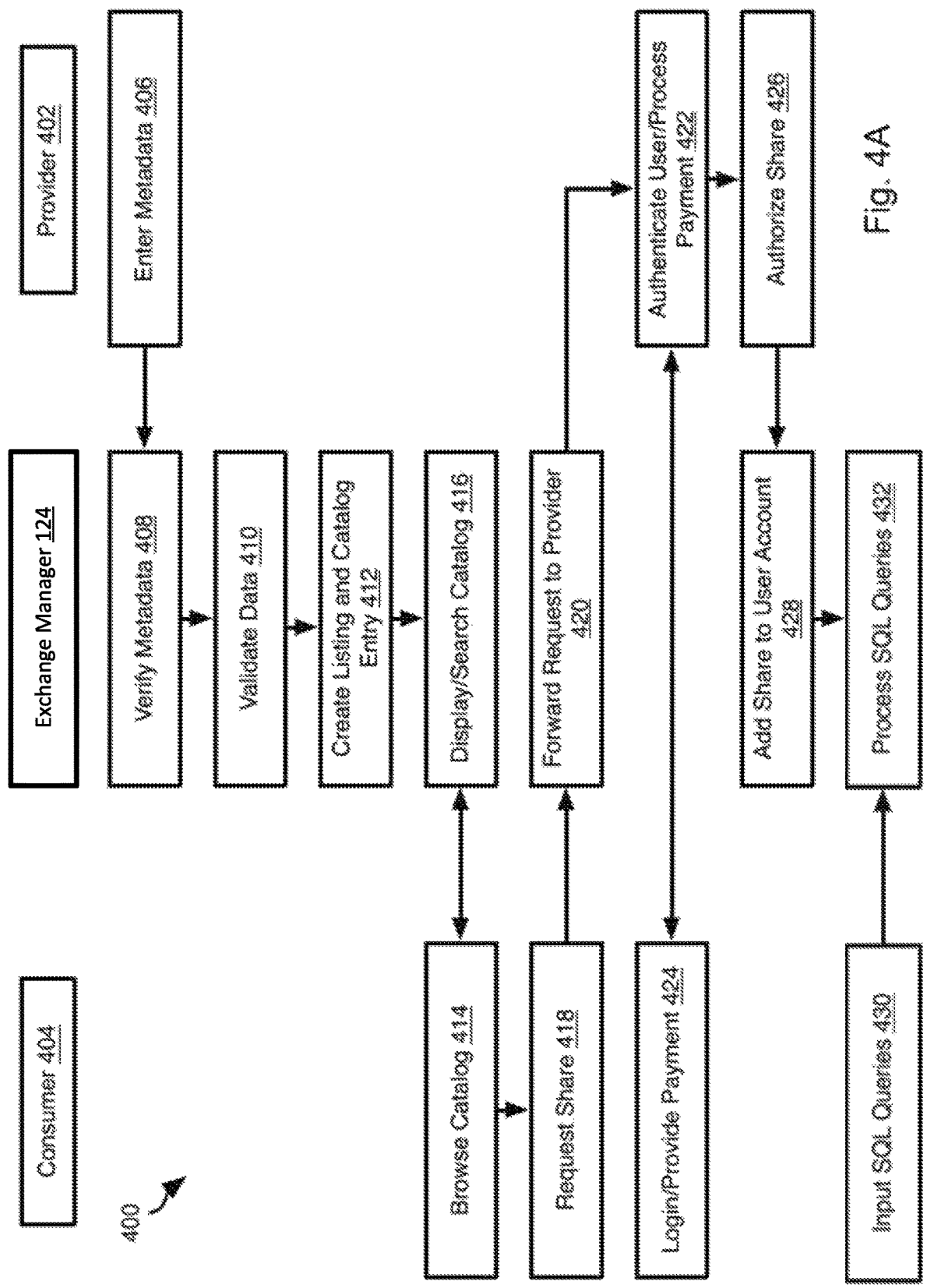
FIG. 4A is a process flow diagram of a method for controlled sharing of data among entities in a data exchange in accordance with an embodiment of the present invention.

Note that the exchange referenced in FIG. 4A may be a private exchange or a public exchange. In particular, those listings 202 that are displayed and searched 416 and viewable by the consumer 404 during browsing 414 may be limited to those having filters 208 that indicate that the listing 202 is viewable by the consumer 404, an organization of the consumer, or some other classification to which the consumer 404 belongs. Where the exchange is public, then the consumer 404 is not required to meet any filter criteria in some embodiments.

The method 400 may include the consumer 404 requesting 418 to access data corresponding to a listing 202. For example, by selecting an entry in the listing on the devices 101-104 of the consumer 404, which invokes transmission of a request to the exchange manager 124 to add the listing 202 corresponding to the entry to the consumed shares 156 in the user record 212 of the consumer 404.

In the illustrated example, the listing 202 of the selected entry has access controls 206. Accordingly, the exchange manager 124 may forward 420 the request to the provider 402 along with an identifier of the consumer 404. The consumer 404 and provider 402 may then interact to one or both of (a) authenticate (login) 424 the consumer 404 with respect to the provider 402 and (b) process 424 payment for access of the data referenced by the listing 202. This interaction may be according to any approach to logging in or authenticating or known in the art. Likewise, any approach for processing payment between parties may be implemented. In some embodiments, the data warehouse module may provide a rebate to the provider 402 due to credits consumed by the consumer 404 when accessing the shared data of the provider. Credits may be units of usage purchased by a user that are then consumed in response to services of the virtual warehouse 131 used by the consumer 404, e.g., queries and other analytics performed on data hosted by the virtual warehouse 131. The interaction may be directly between devices of the consumer 404 and provider 402 or may be performed by way of the exchange manager 124. In some embodiments, the exchange manager 124 authenticates the consumer 404 using the access control information 206 such that interaction with the provider 402 is not needed. Likewise, the listing 202 may define payment terms such that the exchange manager 124 processes payment without requiring interaction with the provider 402. Once the provider 402 determines that the consumer 404 is authenticated and authorized to access the data referenced by the listing 202, the provider 402 may notify 426 the exchange manager 124 that the consumer 404 may access the data referenced by the listing 202. In response, the exchange manager 124 adds 428 a reference to the listing 202 to the consumed shares 156 in the user record 212 of the consumer 404.

Note that in some instances a listing 202 does not list specific data, but rather references a particular cloud service 120, e.g., the brand name or company name of a service. Accordingly, the request to access the listing 202 is a request to access user data 150 of the consumer making the request. Accordingly, steps 422, 424, 426 including authenticating the consumer 404 with respect to the authentication engine 121 such that the cloud service 120 can verify the identity of the consumer 404 and inform the exchange manager 124 of which data to share with the consumer 404 and to indicate that the consumer 404 is authorized to access that data.

In some embodiments, this may be implemented using a "single sign on" approach in which the consumer 404 authenticates (logs in) once with respect to the cloud service 120 and thereafter is enabled to access the consumer's 404 data in the service database 128. For example, the exchange manager 124 may present an interface to the cloud service 120 on the devices 101-104 of the consumer 404. The consumer 404 inputs authentication information (username and password, certificate, token, etc.) into the interface and this information is forwarded to the authentication engine 121 of the cloud service 120. The authentication information processes the authentication information and, if the information corresponds to a user account, notifies the exchange manager 124 that the consumer 404 is authenticated with respect to that user account. The exchange manager 124 may then identify the user data 150 for that user account and create a database referencing it. A reference to that database is then added to the consumed shares 156 of the consumer 404.

In some embodiments, the user's authentication with respect to the virtual warehouse 131 is sufficient to authenticate the user with respect to the cloud service 120 such that steps 422, 424 are omitted in view of the prior authentication of the consumer 404. For example, the virtual warehouse 131 may be indicated by the consumer 404 to the cloud service 120 to be authorized to verify the identity of the consumer 404.

In some embodiments, the exchange manager 124 authenticates the consumer 404 using the access control information 206 such that interaction with the provider 402 is not needed. Likewise, the listing 202 may define payment terms such that the exchange manager 124 processes payment without requiring interaction with the provider 402. Accordingly, in such embodiments, step 422 is performed by the exchange manager 124 and step 426 is omitted. The exchange manager 124 then performs step 428 once the consumer 404 is authenticated and/or provided required payment.

In some embodiments, adding a listing 202 to the consumed shares of a consumer 404 may further include receiving, from the consumer 404, consent to terms presented to the consumer 404. In some embodiments, where the terms of the agreement are changed by a provider 402 after a consumer 404 has added the listing 202 according to the method 400 or other method described herein, the exchange manager 124 may require the consumer 404 to agree to the changed terms before being allowed to continue to access the data referenced by the listing 202.

Adding 428 the data referenced by the listing 202 may include creating a database referencing the data. A reference to this database may then be added to the consumed shares 156 and this database may then be used to process queries referencing the data referenced by the share record. Adding 428 the data may include adding data filtered according to filters 208. For example, data referenced by the listing 202 (e.g., a filtered view of the data) and that is associated with the consumer 404, organization of the consumer 404, or some other classification of the consumer 404.

In some embodiments, adding the listing 202 to the user record 212 may include changing the access controls 206 of the listing 202 to reference the identity data 214 of the consumer 404 such that attempts to access the data referenced by the listing 202 will be permitted and executed by the exchange manager 124.

The consumer 404 may then input 430 queries to the SQL engine 310 by way of the consumer's devices 101-104. The queries may reference the data referenced in the listing 202 added at step 428 as well as other data referenced in the user database 152 and consumed shares 156. The SQL engine 310 then processes 432 the queries using the database created at step 428 and returns the result to the consumer 404 or creates views, materialized views, or other data that may be accessed or analyzed by the user. As noted above, the data of consumed shares operated upon by the queries may have been previously filtered to include only data relating to the consumer 404. Accordingly, different consumers 404 adding the same listing 202 to their consumed shares 156 will see different versions of the database referenced by the listing 202.

Figure 4B:
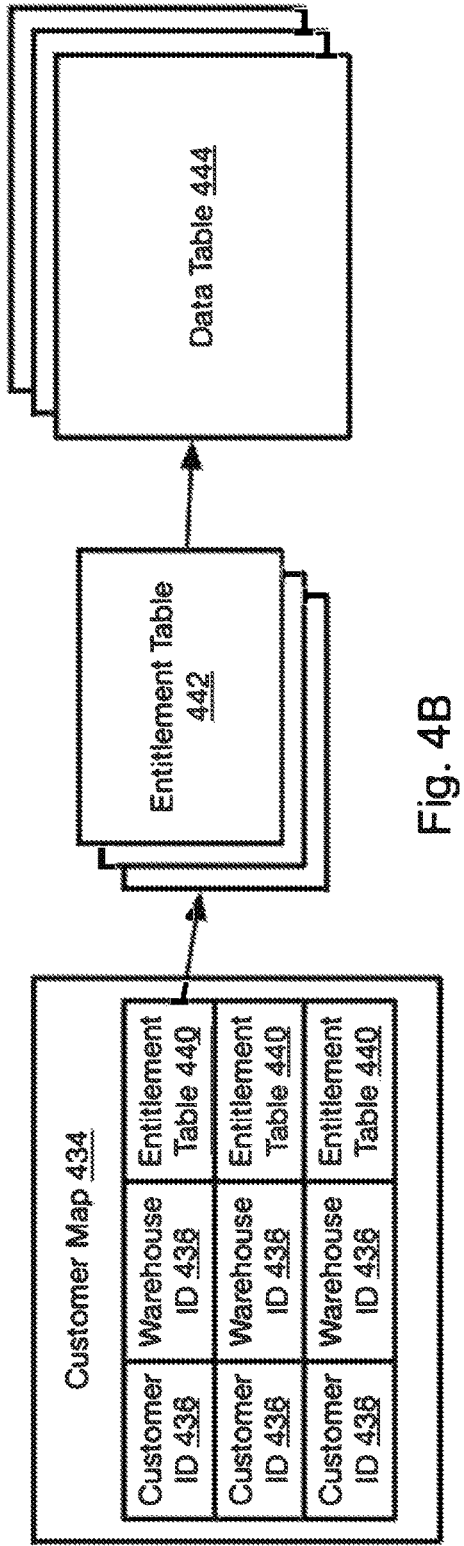
FIG. 4B is a diagram illustrating data used for implementing private sharing of data in accordance with an embodiment of the present invention.
Figure 4C:
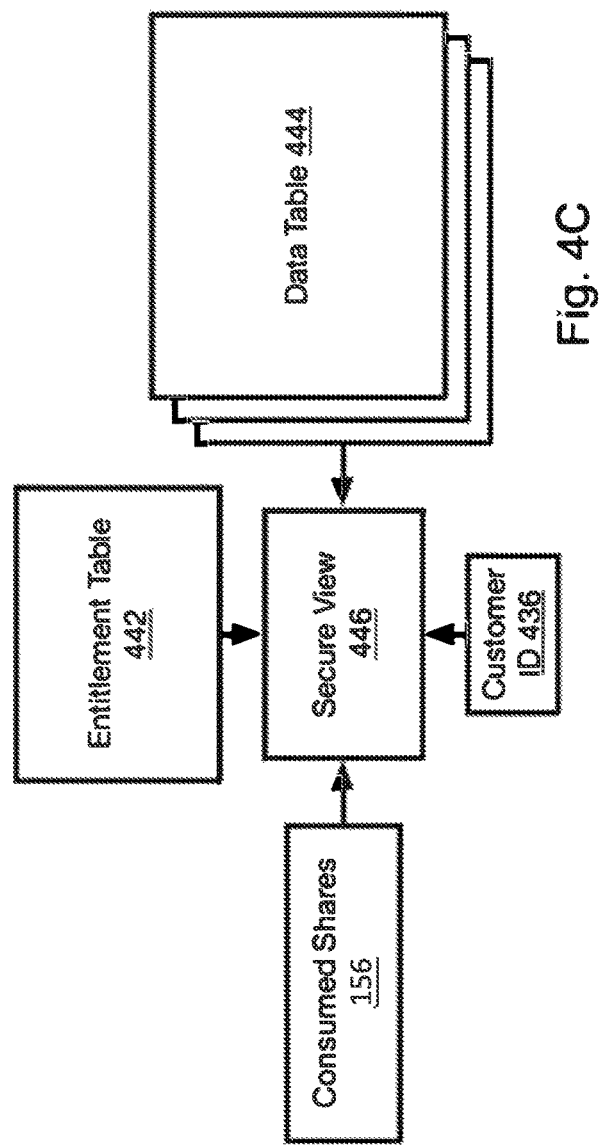
FIG. 4C is a diagram illustrating a secure view for implementing private sharing of data in accordance with an embodiment of the present invention.

Referring to FIG. 4B, in some embodiments, the private sharing of data and filtering of data according to the identity of the consumer 404 may be implemented using the illustrated data structures. For example, the service database 128 of the provider 402 may include a customer map 434 that includes entries for customer identifiers 436 of users of the service provided by the provider 402, e.g., a service implemented by the cloud service 120 of the server and the customer identifier 436 being an identifier for authenticating with the authentication interface. The customer map 434 may map each customer identifier 436 to a warehouse identifier 438, i.e., a user identifier used by a user to authenticate with the virtual warehouse 131 such that the same user corresponds to both identifiers 436, 438. The mapping between the identifiers 436 and 438 may be performed by authenticating as described above (e.g., the single sign on approach described above).

The customer map 434 may further include a reference 440 to an entitlement table 442, which may be one of a plurality of entitlement tables 442. Each entitlement table 442 defines which of one or more tables 444 of the provider 402 may be accessed with the customer ID 436 to which it is mapped. The entitlement table 442 may further define columns of a table 444 that can be accessed with the customer ID 436. The entitlement table 442 may further define rows or types of rows based on one or more filtration criteria of a table 444 that can be accessed with the customer ID 436. The entitlement table 442 may further define a schema for a table 444 that can be accessed with the customer ID 436.

A listing 202 for a table 444 may therefore specify that access to a data table 444 is to be performed as defined by the customer map 434. For example, referring to FIG. 4C, when a consumer 404 requests to add a listing 202 for a database for which access is defined according to the customer map, the exchange manager 124 may create a secure view 446 according to the customer identifier 436 and entitlement table 442 mapped to the warehouse identifier 438 of the consumer 404. The secure view may be generated by performing an inner join of the data tables 444 of the database specified in the entitlement table 442 (or portions thereof as specified in the entitlement table 442) that is filtered according to the customer identifier 436 such that a result of the join includes only data for the specific customer identifier 436 and includes only those portions of the database (tables 444 and/or portions of tables 444) specified in the entitlement table 442. The manner in which the secure view is generated may be as described in U.S. application Ser. No. 16/055,824 filed Aug. 6, 2018, and entitled SECURE DATA SHARING IN A MULTI-TENANT DATABASE and U.S. application Ser. No. 16/241,463 filed Jan. 7, 2019 and entitled SECURE DATA SHARING IN A MULTI-TENANT DATABASE.

Figure 5:
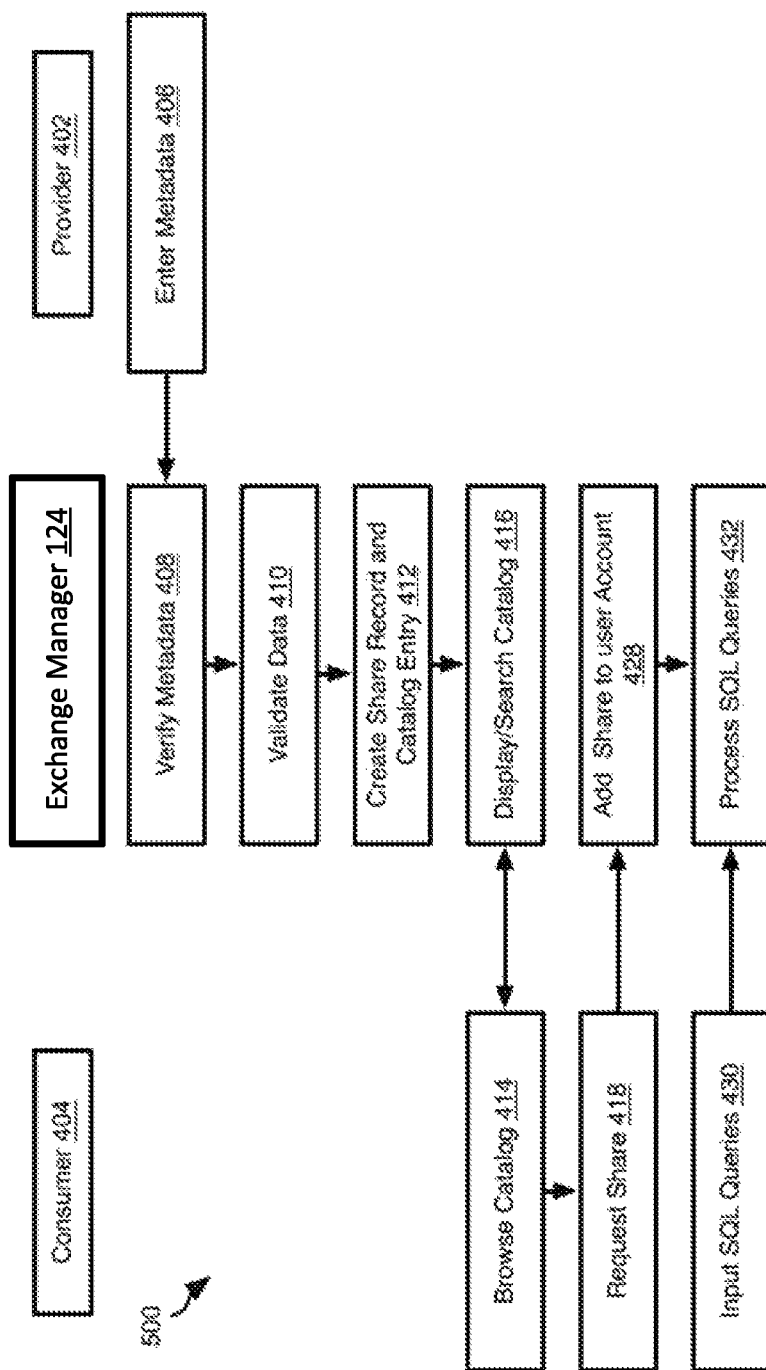
FIG. 5 is a process flow diagram of a method for public sharing of data among entities in a data exchange in accordance with an embodiment of the present invention.

FIG. 5 illustrates an alternative method 500 for sharing data that may be performed when the consumer requests 418 to add a listing 202 that is available to the public or to all users of a private exchange. In that case, the exchange manager 124 adds 428 the reference to the listing 202 to the consumed shares 156 of the consumer 404 and authentication or payment steps are omitted. Step 428 may be performed as described above except that no change to access controls 206 is performed. Likewise, steps 430 and 432 may be performed with respect to the shared data as described above. The exchange of FIG. 5 could be a public exchange or a private exchange as described above with respect to FIG. 4. FIG. 5 illustrates the case where if a listing 202 is viewable (i.e. filter criteria permit viewing by the consumer 404 as described above), the consumer 404 is able to add the listing 202 to the consumed shares 156 of the consumer 404 without further authentication or payment.

Note that when a listing 202 is added to the consumed shares 156 of a user according to any of the methods disclosed herein, the exchange manager 124 may notify consumers of the listing 202 when the data referenced by the listing 202 is updated.

Referring to FIG. 6, in some embodiments, a method 600 may include a consumer 404 browsing a catalog and selecting a listing 202 as described for the other methods described herein (see, e.g., FIGS. 4A and 5), from the exchange manager 124, a bidirectional share with respect to the data referenced by the listing ("the shared data") and additional data in the user's database 152 ("the user's data"). Note that in some embodiments the listing 202 of the provider 402 does not reference any specific data (e.g., a specific table or database) and instead offers to perform a service with respect to data provided by the consumer 404. Accordingly, in such instances "the shared data" as discussed below may be understood to be replaced with "the offered service."

In response to this request, the exchange manager 124 implements 604 a point-to-point share of the shared data with respect to the consumer 404 and the provider 402. This may be performed as described above with respect to FIG. 4A, e.g., include authentication of the consumer 404 and possibly filtering of the shared data to only include data associated with the consumer 404 as described above. The exchange manager 124 may further implement a point-to-point share of the user's data with respect to the provider 402 as described with respect to FIG. 4A except: (a) the consumer 404 acts as the provider and the provider 402 acts as the consumer for the user's data and the user's data is added to the consumed shares 156 of the provider 402 and (b) the consumer 404 need not create a listing 202 for the user's data and the user's data need not be listed in the catalog 220.

Following step 606, both the consumer 404 or the provider 402 have access to the shared data and the user's data. Either may then run queries against both of these, join them, perform aggregations on the joined data, or perform any other actions known in the art with respect to multiple databases.

In some embodiments, a bi-directional share may include, or be requested by the consumer 404 to include the provider 402 also joining 608 the shared data and the user data to obtain joined data and returning 610 a reference to the joined data to the exchange manager 124 with a request to add 612 a reference to the joined data to the consumed shares 156 of the consumer 404, which the exchange manager 124 does.

Accordingly, the consumer 404 will now have access to the joined data. Step 608 may further include performing other actions (aggregations, analysis) on the user data and shared data either before or after joining. Step 608 may be performed by the virtual warehouse 131 in response to the request form the consumer 404 to do so.

The result of the join may be either (a) a new database that is a result of the join or (b) a joined database view that defines a join of the shared data and the user data. The result from step 608 (joining, aggregating, analyzing, etc.) may alternatively be added to the original share performed at step 606, 608, e.g. a view (materialized or non-materialized) defining the operations performed at step 608. Steps 608-612 may also be performed by the virtual warehouse 131 in response to a request from the consumer 404 or provider 402 to do so independently from the request made at step 602.

In many instances there are many consumers 404 that attempt to perform bi-directional shares with respect to the provider 402 and these consumers 404 may seek bi-directional shares with respect to their user data that may be in many different formats (schemas) that may be different from a schema used by the shared data of the provider 402. Accordingly, step 608 may include a transformation step. The transformation step maps a source schema of the user's data to a target schema of the shared data. The transformation may be a static transformation provided by a human operator. The transformation may be according to an algorithm that maps column labels of the source schema to corresponding column labels of the target schema. The algorithm may include a machine learning or artificial intelligence model that is trained to perform the transformation. For example, a plurality of training data entries may be specified by human annotators that each include as an input a source schema and as an output include a mapping between the source schema and the target schema. These entries may then be used to train a machine learning or artificial intelligence algorithm to output a mapping to a target schema for a given input source schema.

Data added to the shares consumed by the consumer 404 and provider 402 may then be operated on by the consumer 404 and provider 402, respectively, such as by executing queries against the data, aggregating the data, analyzing the data, or performing any other actions described herein as being performed with respect to shares added to the consumed shares 156 of a user.

In particular embodiments, a data provider may improve its relationship with business partners by enabling the secure interchange of data in a bi-directional manner, as discussed above. Traditional methods of bi-directional data sharing have been challenging to accomplish, and only very limited sets of data are shared via APIs, FTP, or file transfer between companies. And this often comes at great cost, expense, data latency, and even some security risk.

A data provider may instead host a private data exchange, and invite their customers and partners to participate in the exchange. Customers and partners may access data in secure views, for example, and they may also push data in the other direction as well. This could be to share data back to the host, but also to potentially list data so that other participants of the ecosystem can securely share it as well. Data from a public data exchange, other private exchanges, or from other external sources may also be included.

Every large company depends on other companies, and on its customers. Bidirectionally sharing data not only from the company to and from these parties, but also between these external parties themselves, can allow rich, collaborative data ecosystems to develop where groups of companies can work together around data. They can securely discover, combine, and enrich data assets to help service a common customer, or to form new partnerships amongst themselves. Some of these relationships may even lead to opportunities to sell data, secure views of or functions across data to other participants of a walled garden ecosystem.

Figure 7:
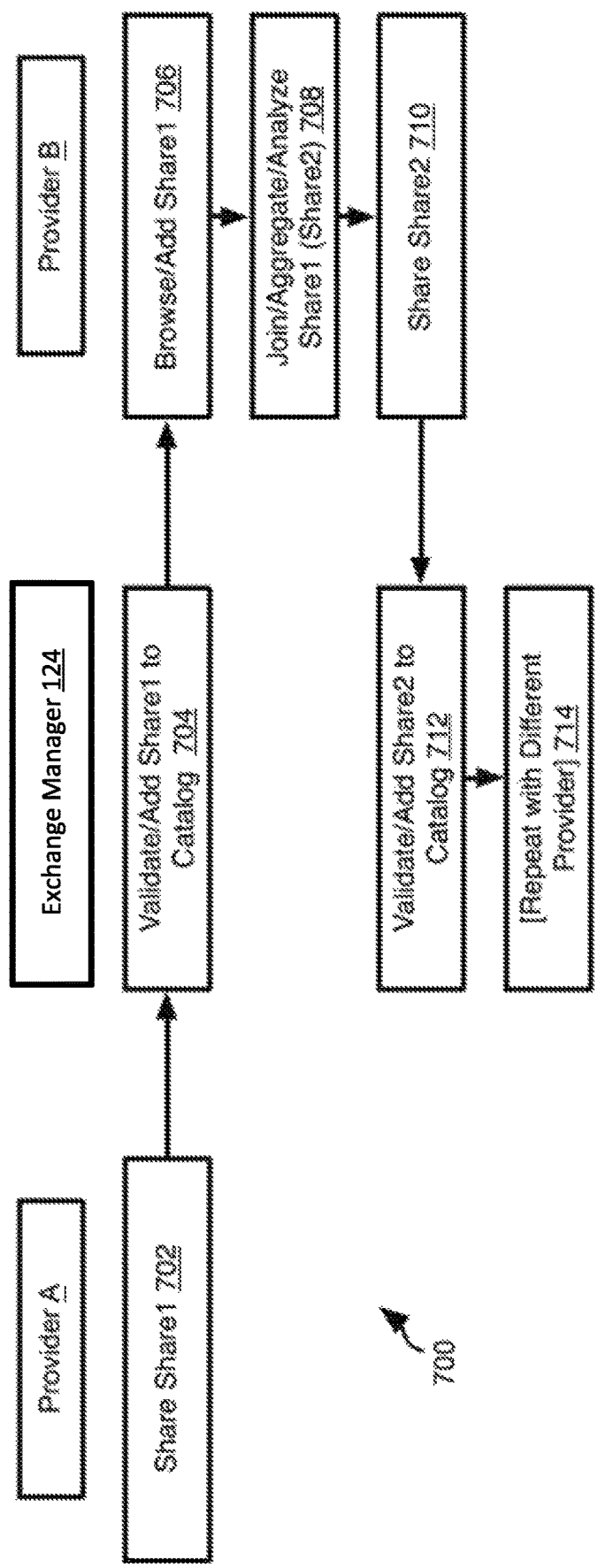
FIG. 7 is a process flow diagram of a method for providing enriched data in a data exchange in accordance with an embodiment of the present invention.

Referring to FIG. 7, the approach to sharing and consuming data as described herein enables enrichment of data and return of that enriched data to the exchange. For example, provider A may request 702 sharing of data (share 1) with the exchange in the same manner as for other methods described herein. The exchange manager 124 verifies, validates, and adds 704 share 1 to the catalog 220.

A second provider B may then browse the catalog 220 and add 706 share 1 to its consumed shares 156. Provider B may perform 708 operations on the shared data such as joining it with other data, performing aggregations, and/or performing other analysis with respect to share 1, resulting in modified data (share 2). Provider B may then request 710 sharing of share 2 with the exchange as described herein. Note that the joining of step 708 may include joining any number of databases, such as any number of shares based on any number of listings by any number of other users. Accordingly, iterations of steps 702-710 by many users may be viewed as a hierarchy in which a large number of listings 202 of multiple users are narrowed down to a smaller number of listings 202 based on the data from the larger number of listings 202.

The exchange manager 124 verifies, validates, and adds 712 share 2 to the catalog 220. This process may be repeated 714 with respect to share 2, as provider A, provider B, or a different provider adds share 2, generates modified data based on it, and adds the result back to the catalog in the same manner. In this manner, a rich ecosystem of data and analysis may be made available to users. The shares according to the method 700 may be any shares, point-to-point shares, private exchange shares, or bi-directional exchange shares according to the methods disclosed herein.

In embodiments, the provider may perform steps 708 and 710 with respect to a listing 202 that is based on a listing 202. For example, listing L1 of provider A is used by provider B to create listing L2, which is used by provider C to create listing L3, which is used by provider A to define listing L1. Such a flow could include any number of steps. This may be undesirable in some cases such that modification of listing L1 to reference L3 is not permitted in view L3 being derived from L1. In other instances, such a loop is permitted provided there is a time delay in when the data referenced by each listing is refreshed. For example, L1 may reference L3 provided L3 will not be refreshed until some time after L1 is refreshed and therefore the circular reference will not result in continuous updating of L1 and L3 ad infinitum. Non-looping flows are also contemplated by this disclosure, such that listing L1 is not influenced by other providers' use of listing L1.

The listing created at step 712 (Share 2) may either (a) include the data from Share 1 remaining after step 708 and as modified according to step 708 or (b) include a view referencing Share 1 (e.g., a database created based on the listing 202 for Share 1 according to the methods disclosed herein) and defining the operations performed at step 708 without including actual data from Share 1 or derived from Share 1. Accordingly, a hierarchy as described above may be a hierarchy of views that either reference one or both of listing 202 that are views created according to the method 700 or listing 202 of data from one or more providers according to any of the methods disclosed herein.

In the methods disclosed herein approaches are disclosed for creating shares (listings 202) and for adding shares. In a like manner, a consumer 404 may instruct the exchange manager 124 to remove added shares. A provider 402 may instruct the exchange manager 124 to cease sharing certain listings 202. In some embodiments, this may be accompanied by actions to avoid disrupting consumers 404 of those listings 202. Such as by notifying these consumers 404 and ceasing to share the listings 202 only after a specified time period after the notification or after all consumers 404 have removed references to the listings 202 from their consumed shares 156.

Use Cases

In a first use case a company implements a private exchange according to the methods described above. In particular, listing 202 of the company are viewable only by consumers 404 that are associated (employees, management, investors, etc.) with the company. Likewise, adding of listing 202 is permitted only for those associated with the company. When adding a listing 202 to the consumed shares 156, it may be filtered based on the identity of the consumer that adds it, i.e. data that is relevant to the consumer's role within the company.

In a second use case, a provider 402 creates a reader or reader/writer account for a consumer 404 that is not yet a user of the virtual warehouse 131. The account may be associated with the account data of the consumer (see consumer map of FIG. 4B discussed above). The consumer 404 may then log on to that account and then access the provider's listings to access the consumer's data 404 that is managed by the provider 402 (see, e.g. discussion of FIG. 4A).

In a fifth use case a consumer 404 adds shares that are private (e.g., accessible due to the identity of the consumer 404 according to the methods described above) and shares that are public. These may then be joined by the consumer 404 and used to process queries.

In a sixth use case, a listing 202 may be shared based on a subscription (e.g., monthly) or be accessed based on per-query pricing, or a credit uplift multiplier. Accordingly, the exchange manager 124 may manage processing of payment and access such that the consumer 404 is allowed to access the data subject to the pricing model (subscription, per query, etc.).

In a seventh use case, the exchange manager 124 implements secure functions and secure machine learning models (both training and scoring) that may be used to process private data such that the consumer 404 is allowed to use the result of the function or machine learning model but does not have access to the raw data processed by the function or machine learning model. Likewise, the consumer of the shared data is not allowed to export the shared data. The consumer is nonetheless allowed to perform analytical functions with respect to the shared data. For example, the following secure function may be implemented to enable viewing of customer shopping data in a secure manner:

select 6139 as input_item, ss_item_sk as basket_Item, count(distinct ss_ticket_number) baskets from udf_demo.public.sales where ss_ticket_number in (select ss_ticket_number from udf_demo.public.sales where ss_item_sk=6139) group by ss_item_sk order by 3 desc, 2;

In an eighth use case, the exchange manager 124 may provide usage statistics of a listing 202 by one or more consumers 404 to the provider 402 of the listing, e.g., queries, credits used, tables scanned, tables hit, etc.

In a ninth use case, the systems and methods disclosed herein are used for industry-specific applications. For example:
1. Cybersecurity
   a. Allows for sharing of risk vectors, bad actors, IP white/blacklists, realtime attacks in progress, known good/bad emailers, etc.
2. Healthcare
   a. Secure sharing of patient information, including cost information and outcome information, among other types of information
   b. Secure multi-hospital databases so patients can share their information to multiple providers. (e.g., if patient A lives in California and travels to Florida on vacation, is injured, and is treated in an emergency room, the hospital in Florida may be able to access patient A's records from disparate hospitals and providers.)

Other industries may also benefit from private or public sharing of data according to the systems and methods disclosed herein. Such as the financial services industry, telecommunications industry, media and advertising industry, government agencies, militaries, and intelligence agencies.

In a tenth use case, a first user provides marketing services for a second user and, therefore, the second user shares a customer list with the first user. The first user shares data regarding a marketing campaign to the second user, such as campaign metadata, current user events (session start/end for specific users, purchases for specific users, etc.). This may be accomplished using the bi-directional sharing of FIG. 6. This data may be joined (customer list+customer events from first user) in order to obtain a better understanding about events for a specific user or groups of users. As noted above, this exchange of data may be performed without creating copies or transferring data—each user accesses the same copy of the shared data. Since no data is transferred, the data may be accessed in near real time as customer events occur.

Figure 8:
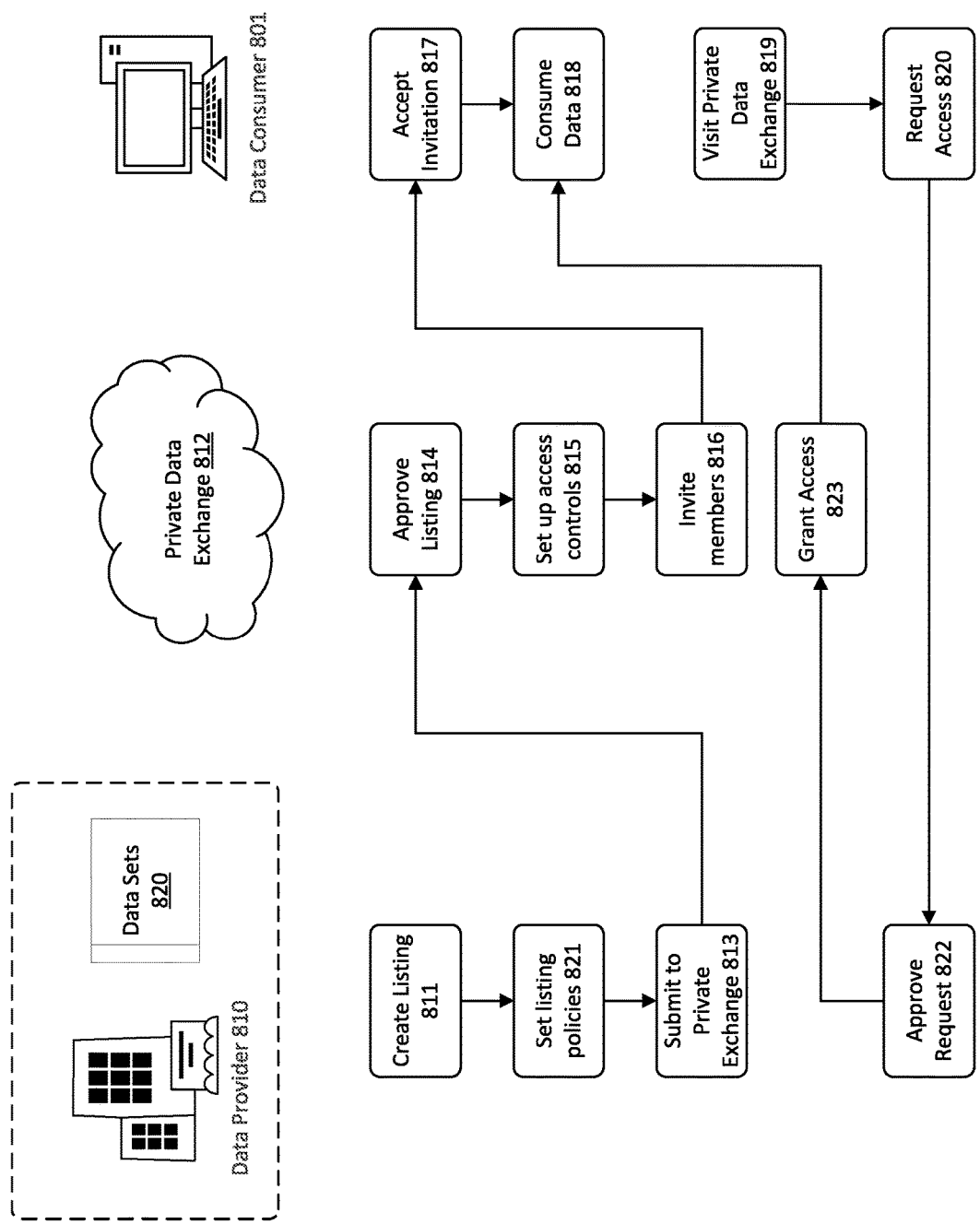
FIG. 8 is a block diagram illustrating a network environment in which a data provider may share data via a cloud computing service.

FIG. 8 is a block diagram illustrating a network environment in which a data provider may share data via a cloud computing service. A data provider 810 may upload one or more data sets 820 in cloud storage using a cloud computing service 112. These data sets may then become viewable by one or more data consumers 101-104. The data provider 810 may be able to control, monitor, and increase the security of its data using the cloud computing service 112 using the methods and systems discussed herein. In particular embodiments, the data provider 810 may implement a private data exchange on its own online domain using the functionality, methods, and systems provided by cloud computing service 112. Data providers 810 may be any provider of data, such as retail companies, government agencies, polling agencies, non-profit organizations, etc. The data consumers 101-104 may be internal to the data provider 810 or external to the data provider 810. A data consumer that is internal to the data provider may be an employee of the data provider. The data provider may be a bike-share company, which provides bicycles for a daily, monthly, annual, or trip-based fee. The bike share company may gather data about its users, such as basic demographic information as well as ride information, including date of ride, time of ride, and duration of ride. This information may be available to employees of the bike share company via the cloud computing service 112.

The interaction between a data provider 810, private data exchange 812 (as implemented by cloud computing service 112), and a data consumer may be as follows. The data provider may create one or more listings 811 using data sets 820. The listings may be for any suitable data. For example, a consumer data company may create a listing called "video streaming" that contains data related to the video streaming habits of a large number of users. The data provider may set listing policies 821 related to who may view the listing 811, who may access the data in the listing 811, or any other suitable policy. Such listing policies are discussed above with reference to FIG. 2. The data provider 810 may then submit to the private exchange 812 at step 813. The private data exchange 812 may be embedded inside a web domain of the data provider 810. For example, if the web domain of the consumer data company is www.entityA.com, the private data exchange may be found at www.entityA.com/privatedataexchange. The private data exchange 812 may receive the listing and approve it at step 814 if the listing complies with one or more rules as determined by the cloud computing service 112. The private data exchange 812 may then set up access controls at 815 at least in part according to the listing policies what were set in step 821. The private data exchange 812 may then invite members at step 816. The members may be data consumers 801. The data consumers 801 may accept the invitation at step 817 and then may begin consuming the data at 818. The type of data consumption may depend on the access controls that were established at 815. For example, the data consumer may be able to read the data only or share the data. As another example, a data consumer may be able to do any combination of the above read, or share operations on the data, subject to the access controls. In general, data sharing does not involve altering shared data.

In some embodiments, a data consumer 801 may independently access the private data exchange 812, either by directly navigating to the private data exchange 812 in a browser, or by clicking on an advertisement for the private data exchange 812, or by any other suitable mechanism. A private data exchange may also be rendered via custom or other code by accessing listing and other information via an API. If the data consumer 801 wishes to access the data within a listing and the listing is not already universally available or the data consumer 801 does not already have access, the data consumer 801 may need to request access at step 820. The data provider may approve or deny the request at 822. If approved, the private data exchange may grant access to the listing at 823. The user may then begin consuming the data as discussed above.

In particular embodiments, one or more data exchange administrator accounts may be designated by the cloud computing service 112. The data exchange administrator account may be an account associated with the data exchange that facilitates the management of members of the private data exchange by designating members as data providers 810 or data consumers 801. The data exchange administrator account may facilitate the control of listing visibility by enabling selection of which members can see a given listing. The data exchange administrator account may also have other functions such as approving listings before they are published on the private data exchange, track usage of each of the listings, or any other suitable administrative function. In some embodiments, the data exchange owner, the data provider, and the data exchange administrator account are part of the same entity; in some embodiments, they are separate entities. A data provider may create listings, may test sample queries on the data underlying a listing, may set listing access, grant access to listing requests, and track usage of each of the listings and the data underlying the listings. In some embodiments, the data exchange administrator account may grant or deny listing requests (e.g., publish requests or access requests) instead of the data provider. A data consumer 801 may visit a private data exchange and browse visible listings which may appear as tiles. To consume the data underlying a listing, the consumer may either immediately access the data, or may request access to the data.

Figure 9:
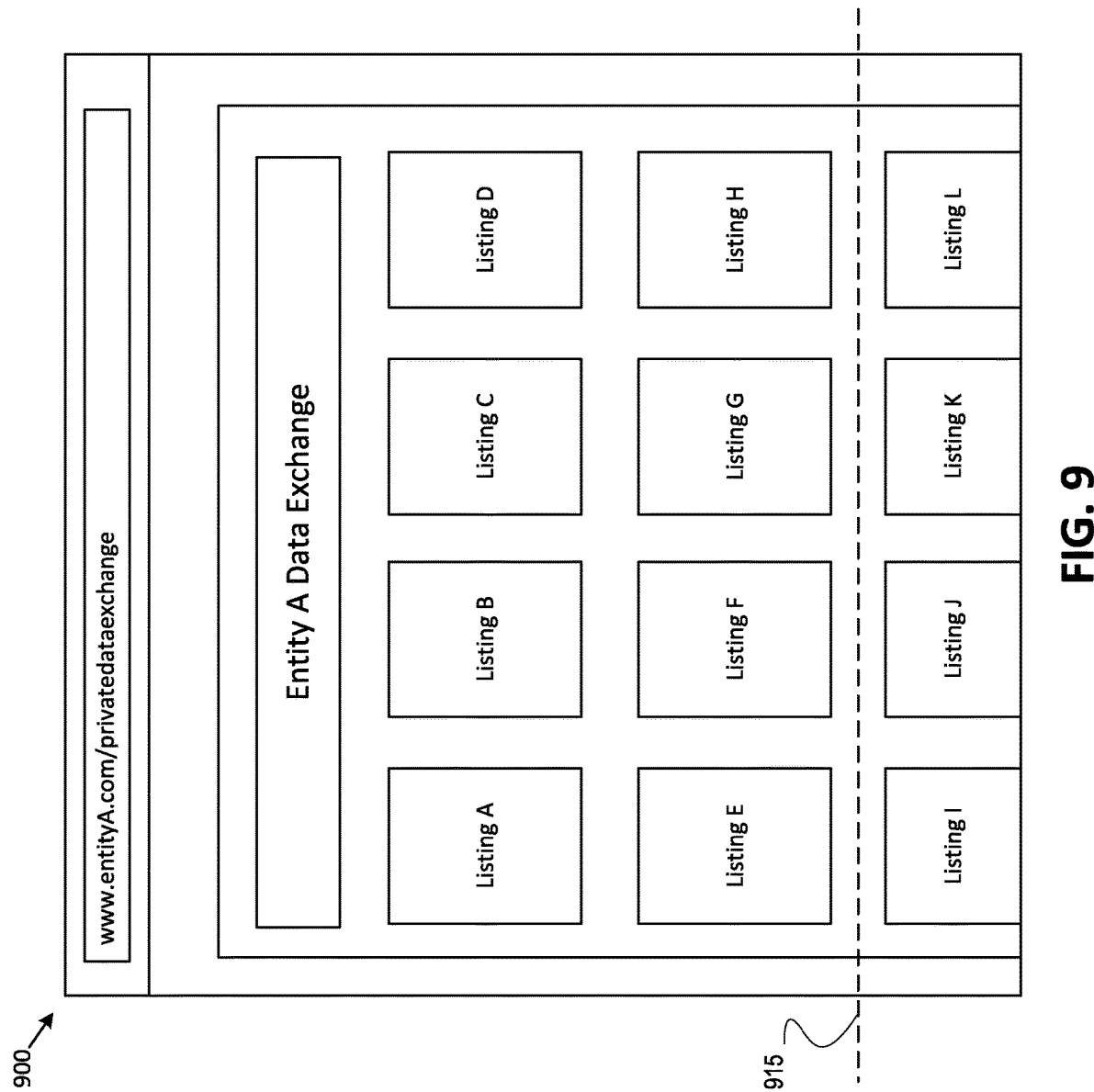
FIG. 9 is an example private data exchange in accordance with an embodiment of the present invention.

FIG. 9 is an example private data exchange 900 in accordance with an embodiment of the present invention. Private data exchange 900 may be what a data consumer sees when she navigates to the private data exchange on the web. For example, the data consumer may enter www.entityA.com/privatedataexchange in her browser. As discussed herein, "Entity A Data Exchange" may be a private data exchange that is facilitated by the cloud computing service 112 and is embedded into Entity A's own web domain or into an application, or may be accessed via an API. Private data exchange 900 may include several listings for different data sets, for example listings A-L. The listing A-L may also be referred to herein as a data catalog, which may allow visitors to the private data exchange to view all the available listings in the private data exchange. These listings may be placed by an administrator account internal to Entity A. Providing a data catalog in this manner may serve to combine the benefits of crowdsourced content, data quality, and the right level of centralized control and coordination that can overcome the challenges that have slowed the adoption of other approaches to enterprise data cataloging (e.g., indexing and crawling systems). It allows users across an enterprise to contribute data, use data from other groups, and join data together to create enriched data products, for both internal use as well as potentially for external monetization.

As an example and not by way of limitation, Entity A may be a data collection company that has collected and analyzed the consuming habits of millions of individuals in several different categories. Their data sets may include data in the following categories: online shopping, video streaming, electricity consumption, automobile usage, internet usage, clothing purchases, mobile application purchases, club memberships, and online subscription services. Each of these data sets may correspond to different listings. For example, Listing A may be for online shopping data, Listing B may be for video streaming data, Listing C may be for electricity consumption data, and so on. Note that the data may be anonymized so that individual identities are not revealed. The listings located below line 915 may correspond to third-party listings that entity A may allow on its private data exchange. Such listings may be generated by other data providers and may be subject to approval by Entity A before being added to the private data exchange 900. A data consumer may click on and view any of the listings subject to various access controls and policies as discussed above with reference to FIGS. 2, 4, and 8.

In particular embodiments, a data provider may invite members to access its private data exchange, as discussed with reference to FIG. 8. One class of members may be the physical and digital supply chain suppliers of the data provider. For example, a data provider may share data with suppliers on its inventory levels or consumption of things provided by the suppliers, so they can better meet the needs of the data provider. In addition, digital data providers may provide data directly into its private data exchange, to make it immediately usable and joinable to the internal enterprise data, saving costs for both parties on transmitting, storing, and loading the data.

Some companies such as hedge funds and marketing agencies bring in data from many external sources. Some hedge funds evaluate hundreds of potential data sets per year. A private data exchange may be used to not only connect with data that has already been purchased, but can also be used to evaluate new data assets. For example, a hedge fund could have potential data suppliers list their data on their private exchange, and the fund could explore and "shop" for data in a private data store where they are the only customer. Such an internal data store could also "tunnel" in data assets from a public Data Exchange (e.g., the SNOWFLAKE public Data Exchange), as discussed with reference to FIG. 11.

As another example, an existing provider of marketing data to a company could list some additional datasets that their customer could use via their private exchange on a trial basis, and if the customer finds them useful, the supplier can immediately provide full access through the same exchange. These arrangements can bring much greater depth of data, bi-directional and much fresher data, and greater trust and transparency to relationships between suppliers of data and physical goods and their customers.

Figure 10:
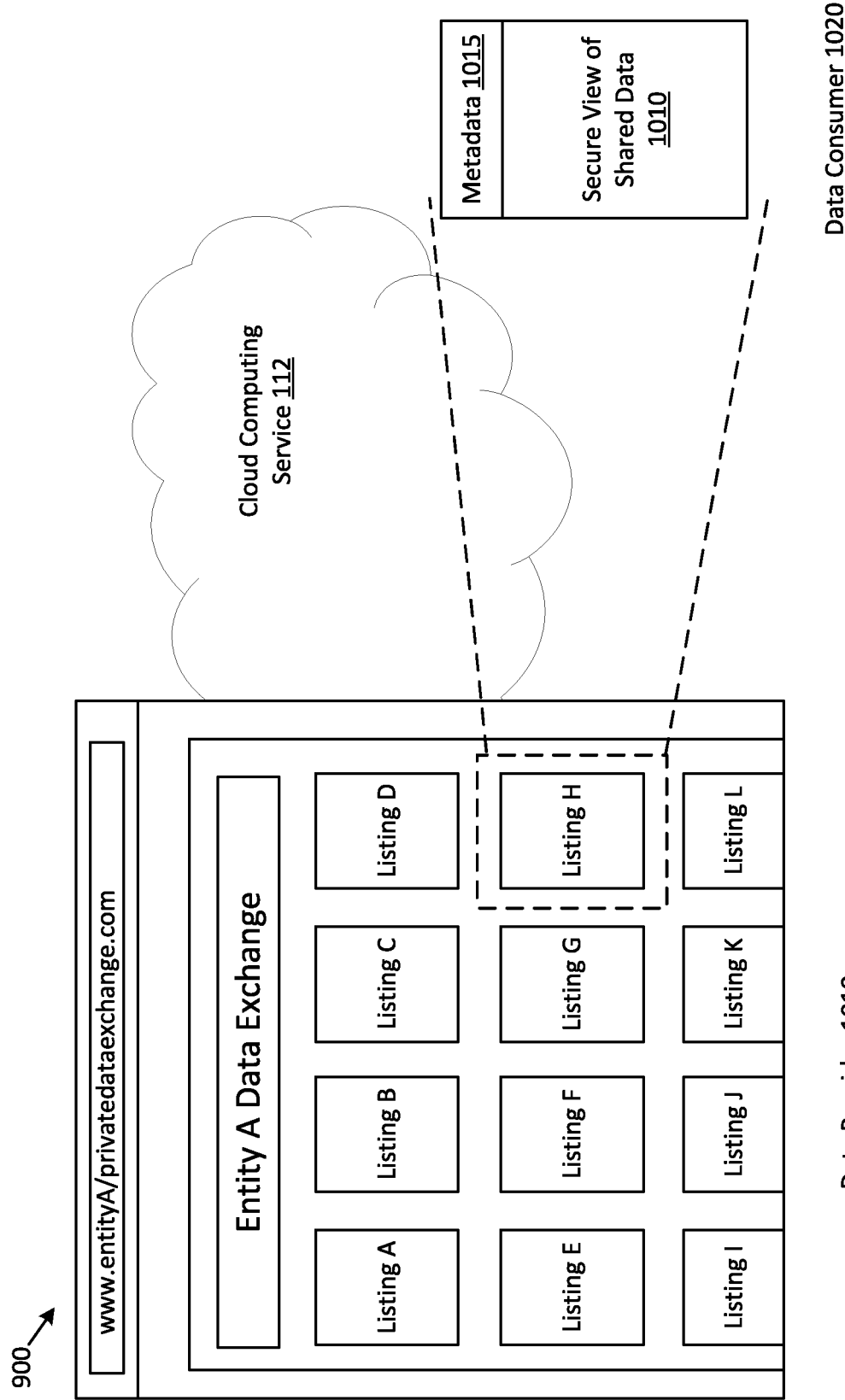
FIG. 10 is a diagram illustrating an example secure view of shared data from a private data exchange.

FIG. 10 is a diagram illustrating an example secure view of shared data from a private data exchange. When a data consumer 1020 wishes to access data in a listing (e.g., Listing H), the cloud computing service 112 may facilitate access via a secure view of shared data 1010. The secure view of shared data 1010 may include metadata 1015 that includes the metadata and access controls discussed herein with reference to FIG. 2. This may allow data providers to share data without exposing the underlying tables or internal details. This makes the data more private and secure. With a secure view of shared data 1010, the view definition and details are only visible to authorized users.

In a private data exchange, data may be shared both within the same entity and between different entities. Additionally, the data sharing may be one-way, two-way, or multi-way. This leads to five main use-cases for sharing data: two-way inter-entity, two-way intra-entity, one-way inter-entity, one-way intra-entity, and multi-way multi-entity. An example of two-way inter-entity data sharing may be data sharing from portfolio companies to a parent company and between portfolio companies. An example of two-way intra entity data sharing may be data sharing from the headquarters of a large company to the different business units within that company, and also data sharing from the business units to headquarters. An example of one-way inter-entity data sharing may be a large data provider (e.g., a national weather service) that shares data with lots of different entities, but does not receive data from those entities. An example of one-way intra-entity may be a large company that provides data to its respective business units but does not receive data from those business units. In particular embodiments, data may be shared as "point-to-point shares" of specific data, or as "any-shares". A point-to-point share of specific data may include a private data exchange share between a parent company and specific portfolio companies. An any-share may include a private data exchange share from a parent company to a broad group of data consumers on a public or within a private exchange.

In particular embodiments, the cloud computing service 112 may generate a private data exchange for an entity who is the owner of the data to be shared on the private data exchange. The cloud computing service 112 may designate one or more administrator accounts of the private data exchange. These administrator accounts may have control over the access rights of the private data exchange with regard to other users. For example, an administrator account may facilitate the addition of another user account to the private data exchange and designation of that account as a data provider, data consumer, exchange administrator, or a combination of these.

In particular embodiments, the exchange administrator account may facilitate control viewing and access rights to the private data exchange. Viewing rights may include a list of entities that may view the listing in the private data exchange. Access rights may include a list of entities that may access the data after selecting a particular listing. For example, a company may publish private data exchange 900 and may include several listings, Listing A through Listing L. Each of these listings may include their own individual viewing and access rights. For example, Listing A may include a first list of entities that have rights to view the listing on the private data exchange 900 and a second list of entities that have rights to access the listing. Viewing a listing may simply be to see that the listing exists on the private data exchange. Accessing a listing may be to select the listing and access the underlying data for that listing. Access may include both viewing the underlying data, manipulating that data, or both. Controlling viewing rights may be useful for data providers who do not want some users to even know that a certain listing exists on the private data exchange. Thus, when a user who does not have viewing rights to a particular listing visits the private data exchange, that user will not even see the listing on the exchange.

In particular embodiments, the above discussed viewing and access rights may be provisioned via an application program interface (API). The exchange catalog may be queries and updated via the API. This may allow a data provider to show listings on its own application or website to anyone who visits. When a user wants to access or request access to data, the user may then create an account with the cloud computing service 112 and obtain access. In some embodiments, a URL may be called when a user requests access to data within a listing. This may allow for integration with external request approval workflows. For example, if a user makes an access request, an external request approval workflow of the data provider may be accessed and activated. The external request approval workflow may then operate normally to perform an external request approval process. In some embodiments, a listing may be unlisted, which means that the listing exists but is not visible on the data exchange. To access an unlisted listing, a consumer may input a global URL into the browser. This may require a unique URL for each listing.

In particular embodiments, when a new private data exchange is created for a data provider, the cloud computing service 112 may designate a data exchange administrator account, and may also generate the following metadata about the private data exchange: the name of the private data exchange, which needs to be unique, a display name, a logo, a short description of the private data exchange, and an indication of whether approval from the exchange administrator account is necessary for publishing (e.g., Admin_Approval_for_Publishing). This may be a true/false statement. It may be set to true if the exchange administrator account needs to approve listings submitted to the private data exchange before they are published. It may be set to false if the exchange administrator account does not need to provide such approval. In this case, providers can publish data directly. If the exchange administrator account sets the Admin_Approval_for_Publishing to True, the exchange administrator account may be able to see a list of Listings, and select a listing to preview and approve/reject. The owner of the private data exchange may be the account that is paying for the private data exchange. This metadata information may be stored as part of an Exchange object. Also stored in association with the private data exchange may be the users and accounts who provide data to the exchange, the consumers of the exchange, and the exchange admin(s).

In particular embodiments, the exchange administrator account may add members (e.g., data providers and data consumers) to the private data exchange by inviting the members in any suitable manner. For example, by inviting the users' accounts on the cloud computing service 112, or by sending an email to the users' email account addresses. When the exchange administrator account adds a member to the private data exchange, the exchange administrator account may also specify the member-type: exchange admin, provider, or consumer. An exchange administrator account may be able to add and remove members from the private data exchange and to edit metadata associated with the private data exchange. For each user, the exchange administrator account may designate whether the user is an exchange admin, a data provider, and a data consumer. The following table summarizes the rights associated with each type of account.

TABLE 1

Rights Associated with Each Type of Private Data Exchange Account

| is_Exchange_Admin | is_Data_Provider | is_Data_Consumer | Description |
|---|---|---|---|
| False | False | True | Can Discover & Consume listings (subject to Listing visibility and access rules), but cannot publish listings |
| False | True | True | Can Discover & Consume listings (subject to Listing visibility and access rules), plus can publish listings |
| False | True | False | Can publish listings, but when they go to the consumer view they only see their own listings. They will not be able to 'get' their own listing as they will get a self-sharing prohibited error. |
| True | True | True | Can do everything a data provider and a data consumer can do, as well as add members, remove members, change member roles, access list of member accounts, and edit metadata. |

In some embodiments, if the exchange administrator account removes a member or changes a member's type from provider to a consumer only, then existing listings published by that member may become unpublished from the Exchange. Additionally, existing shares added to the Exchange by the member are no longer considered part of the private data exchange. The listings published by that member may be archived, and are no longer visible in the UI to anyone, including the member. The cloud computing service 112 can un-archive this if the same member (same account on the cloud computing service 112) who has been removed is made a Provider again.

In some embodiments, the exchange administrator account may be able to specify a list of categories as well as edit an existing list. Categories may have icons associated with them, and the exchange administrator account may be able to specify the icon along with the category name.

When a member becomes a data provider, a provider profile may be generated that includes a logo, a description of the provider, and a URL to the provider's website. When submitting listings, a provider may do the following: select which private data exchange to publish the data in (e.g., many private exchanges may exist and the provider may need to select a subset of these exchanges, which may be one or more), and set metadata about the new listing. The metadata may include a listing title, a listing type (e.g., Standard or Personalized), a listing description, one or more usage examples (e.g., title and sample queries), a listing category, which may be input as free form text, an update frequency for the listing, a support email/URL, and a documentation link. The provider may also set access for the listing. The provider may allow the exchange administrator account to control the visibility of the listing, or the provider may retain that control for itself. The provider may also associate a share with a listing. For a standard share, a listing may be associated with zero or more shares. The provider may associate shares to a listing through the UI or SQL. For personalized shares, when the provider provisions a share in response to a request, the provider may associate that share with the listing. When the provider wishes to publish the listing, the listing may first need approval from the exchange admin, depending on the publishing rules of the private data exchange.

Figure 11:
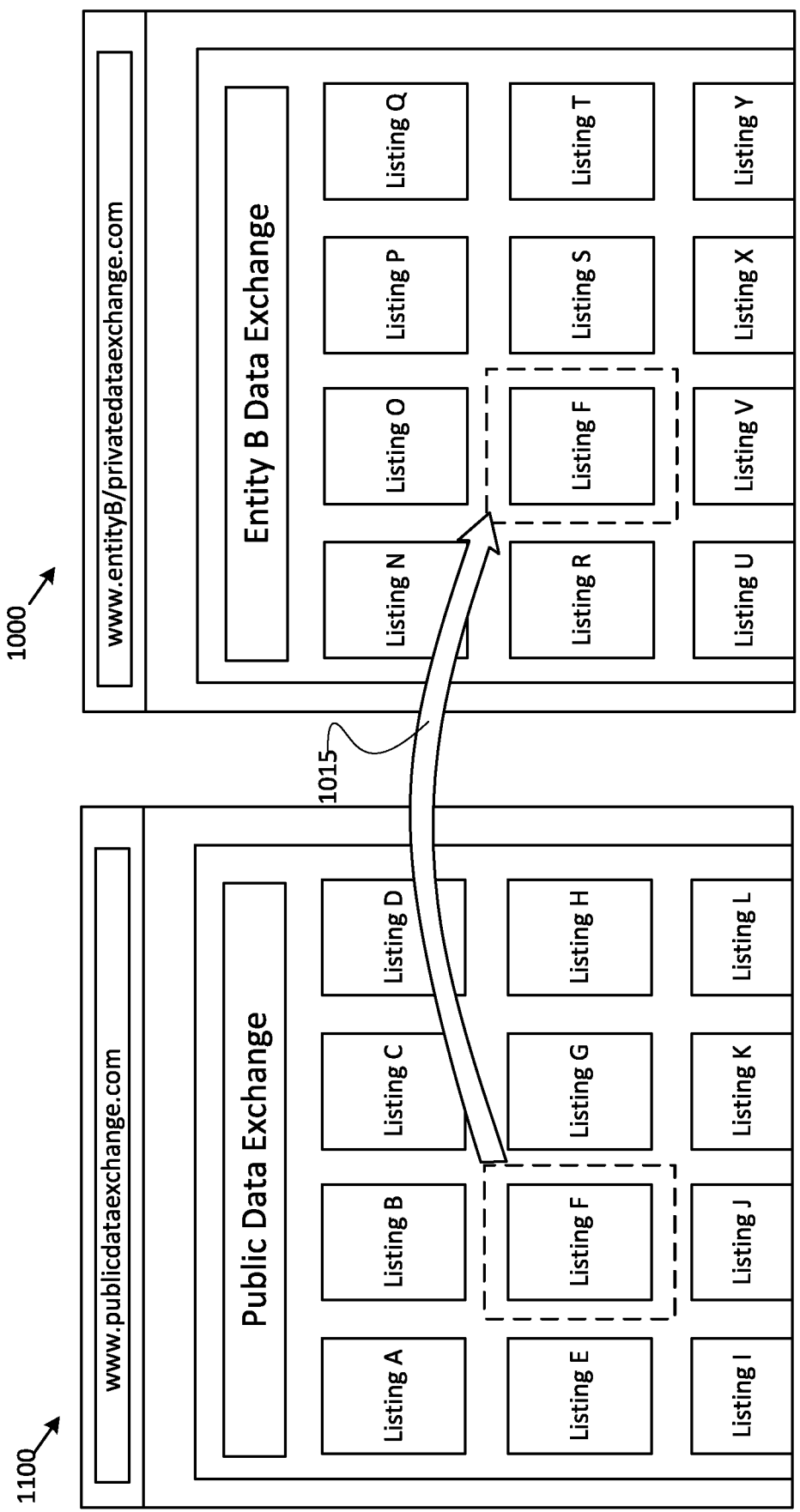
FIG. 11 is a diagram illustrating an example tunneling of a data listing between two private data exchanges.

FIG. 11 is a diagram illustrating an example tunneling of a data listing between a public data exchange and a private data exchange. Alternatively, data may be tunneled between two public data exchanges or between two private data exchanges, or from one public exchange to multiple private exchanges, or any other suitable combination. In some embodiments, an entity may wish to offer a publicly listed data listing on its private data exchange. For example, Entity B may wish to include Listing F of public data exchange 1100 on its own private data exchange 1000. The data underlying Listing F may be tunneled from public data exchange 1100 to private data exchange 1000. In particular embodiments, data may be tunneled between two private data exchanges. At times, a first data provider may wish to allow a second data provider to list data belonging to the first data provider on a private data exchange of the second data provider. Tunneling of data listings may allow the two data providers to offer the same listing. As an example, Entity A and Entity B may have a business agreement to share listing F on each of their private data exchanges. Listing F may be the property of Entity A, but Entity B may have a license to offer it on its private data exchange as well. In this case, both of the listings titled "Listing F" will point to the same data set stored in cloud computing platform 110. The tunnel 1015 is a representation to illustrate that Listing F may be shared securely and easily between two or more data exchanges 1100 and 1000. No data is copied or transferred in the tunneling. Instead, each listing contains a pointer to the data referenced by Listing F as discussed herein.

In particular embodiments, tunnel linking may be accomplished between a private data exchange and a public data exchange, or vice versa. For instance, data exchange 1100 may be a public data exchange. Entity B may use a listing listed on the public data exchange 1100 on its own private data exchange 1000 via tunnel 1015. In some embodiments, a data listing may be tunneled from one data exchange to another data exchange and then the underlying data may be joined with another data set, and then a new listing may be generated from the combined data set. As an example and not by way of limitation, a first data set may be listed on a private data exchange that includes NBA player shooting statistics over the last five years. A second data set may be listed on a different data exchange that includes weather data over the same time span. These two data sets may be joined and listed as a new listing in either a private or a public data exchange. Data consumers may then access this data set, subject to the viewing and access controls discussed herein, to gain insight into how the weather might affect player shooting percentages. Additionally, if data is listed on a public data exchange (e.g., a data exchange hosted by the cloud computing service 112), this data may be tunneled to a private data exchange.

In some embodiments, tunneling of datasets may be used to create an "industry-wide" data exchange that is either public or private. Many different entities may tunnel datasets to a "mega ecosystem data exchange." If a private ecosystem data exchange really takes off, it could become so big and influential that it could become the standard place for a whole industry to interchange, collaborate around, and monetize data. There is probably room for one or two "mega ecosystem data exchanges" in each industry. Once anyone gains significant traction, it could become the "go to" place for that industry. If more than one viable exchange emerges in an industry, the respective hosts of these could decide to partner and "cross-tunnel" some (but maybe not all) assets between their exchanges to get critical mass.

While it is possible that industry coalitions could host such exchanges via tunneling, it may be more likely that one or two large players in each industry will bootstrap ecosystem private data exchanges fast and broadly enough to become the de facto data exchange for their industry. This provides a significant incentive for companies that want to become major players in the data side of their industries to start as soon as they can to build their internal data exchanges and then open them up quickly to their suppliers, customers, and partners.

Figure 12:
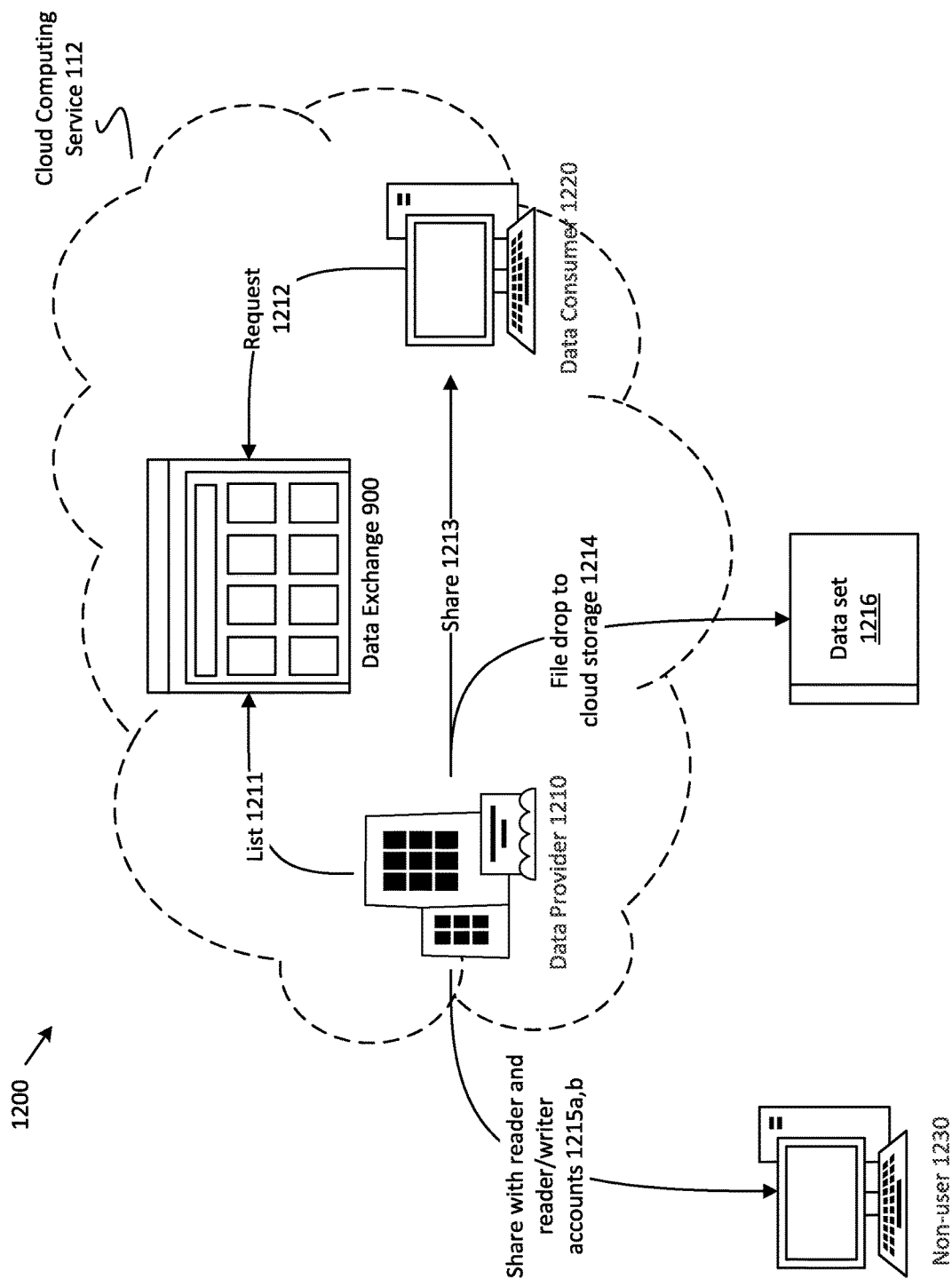
FIG. 12 is a diagram illustrating an example data query and delivery service according to some embodiments of the invention.

FIG. 12 is a diagram illustrating an example data query and delivery service 1200 according to some embodiments of the invention. Data query and delivery service 1200 illustrates four ways a data provider may be able to share data. The first way is through a data exchange 900. The data exchange 900 may be a public data exchange or a private data exchange. The data provider 1210 may list 1211 the data on the data exchange according to the methods and systems described herein with reference to FIGS. 2, 4, and 8. The data consumer 1220 may access the data in the listings by either accepting an invitation from the data provider as discussed herein or by requesting 1212 access to the listing as discussed herein with reference to FIG. 8. The second way data may be shared is by directly sharing the data at 1213. This may be a point-to-point share as discussed with reference to FIG. 4, or may be any other suitable type of share, accomplished using the secure data share methods discussed herein. Note that the data provider 1210 and the data consumer 1220 are both users of the cloud computing service 112. If the data provider 1210 wishes to share data with a non-user 1230, this is possible as a third way to share the data, with a reader account 1215*a* or with a reader/writer account 1215*b*. Here the non-user may need to have a reader account but may not need to be an actual user of the cloud computing service 112. A reader account may allow the non-user 1230 to view the data but do nothing else to the data. Finally, a fourth way to share data is via a file drop to cloud storage 1214. Here the data provider 1210 may make a copy of a data set 1216 and may allow for another non-user 1230 to have the data set 1216. This way of sharing data may not allow the data provider 1210 to retain control of the data set. Thus, using the fourth way, the non-user 1230 may be able to view, manipulate, and re-share the data.

Figure 13:
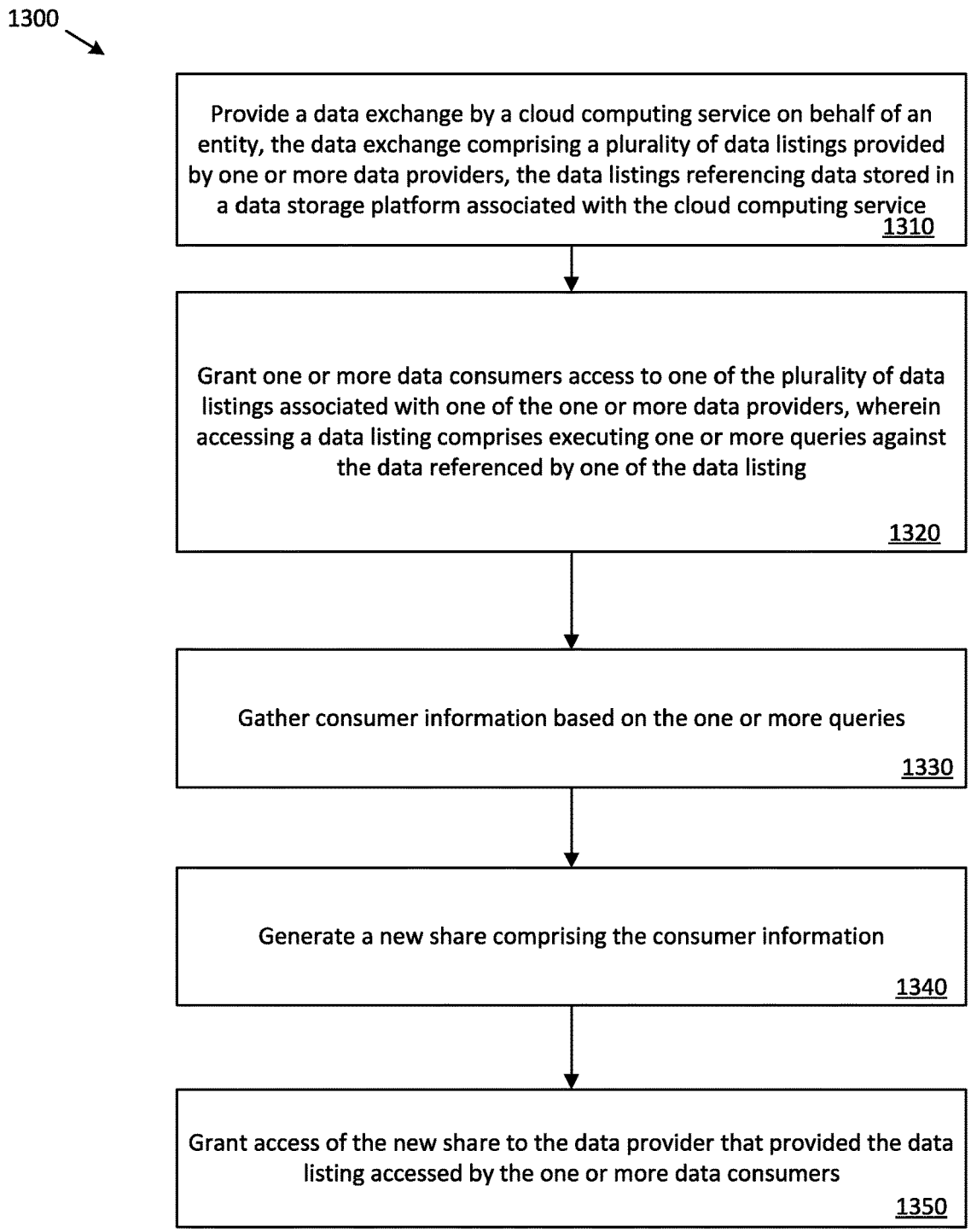
FIG. 13 is a block diagram illustrating an example method for metrics sharing associated with a private data exchange.

FIG. 13 is a block diagram illustrating an example method 1300 for metrics sharing in association with a private data exchange. In general, the method 1300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as exchange manager 124. Method 1300 may begin at step 1310, where the processing logic provides a data exchange by a cloud computing service on behalf of an entity, the data exchange comprising a plurality of data listings provided by one or more data providers, the data listings referencing data stored in a data storage platform associated with the cloud computing service. At step 1320, the processing logic may grant one or more data consumers access to one of the plurality of data listings associated with one of the one or more data providers, wherein accessing a data listing comprises executing one or more queries against the data referenced by one of the data listings.

At step 1330, the processing logic may gather consumer information based on the one or more queries. The consumer information may include an identity of a data consumer that has accessed the data referenced by the data listing. As an example, a data consumer may be a third-party entity called Company A. The consumer information may include a list of data consumers that have accessed the data that includes Company A. In embodiments, the data consumer and the data provider may be part of the same entity. For example, the data provider may be a large retail company and the data consumers may be business groups within the large retail company, such as supply chain groups, marketing groups, legal groups, and other suitable groups. Each business group may have access to the data provided by the online retail company and listed on the private data exchange. The business groups may run queries on the data referenced by the data listings. The consumer information may also or alternatively include an address associated with each set of accessed data. The address may be in any form suitable to identify the location of the accessed data. For example, the address may reference a particular memory block, table, row, or any other suitable object. In embodiments, the consumer information may not include information associated with any specific query that was executed against the data. This may be accomplished by removing or filtering out query-specific information from the consumer information. For example, a data consumer may run a query to return the names and email addresses of all customers in a particular geographic region who have made online purchases in the last 90 days. This query may be removed by the processing logic before the consumer information is shared with the data provider.

At step 1340, the processing logic may generate a new share comprising the consumer information. The new share may be generated using the data sharing methods discussed herein with reference to FIGS. 4-6. At step 1350, the processing logic may grant access of the new share to the data provider that provided the data listing accessed by the one or more data consumers. The access may be granted using any suitable method, including those described herein with reference to FIGS. 8-11. In embodiments, the processing logic may also generate a graphical user interface (GUI) of a metrics dashboard that includes icons that reference the consumer information discussed herein. Specifically, the metrics dashboard may include graphical representations of the identities of the data consumers who access the data, the addresses associated with each set of accessed data, or a frequency with which the address is accessed by the data consumers.

Figure 14:
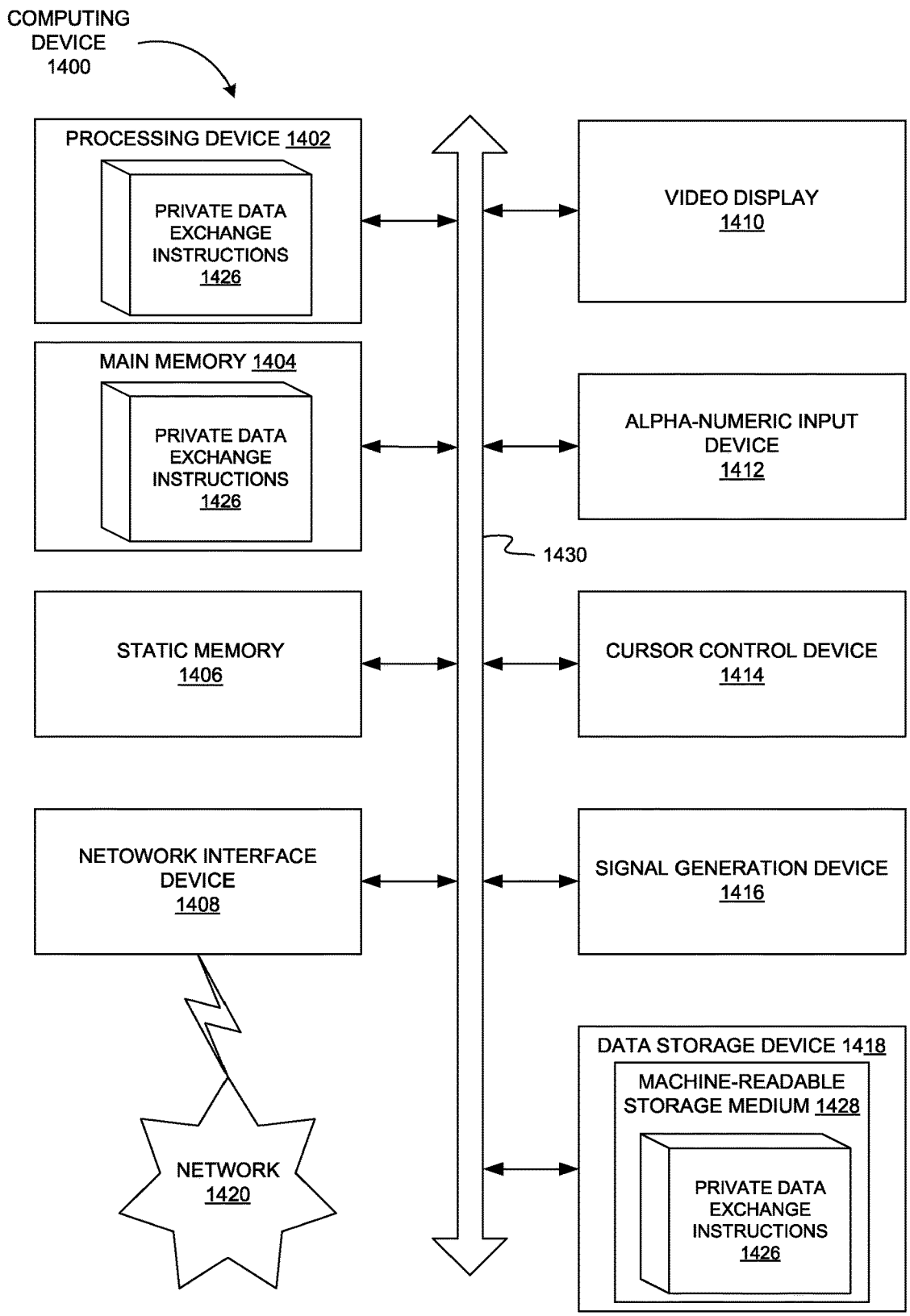
FIG. 14 is a block diagram of an example computing device that may perform one or more of the operations described herein, in accordance with some embodiments.

FIG. 14 is a block diagram of an example computing device 1400 that may perform one or more of the operations described herein, in accordance with some embodiments. Computing device 1400 may be connected to other computing devices in a LAN, an intranet, an extranet, and/or the Internet in either a public or private network. The computing device may operate in the capacity of a server machine in a client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1400 may include a processing device (e.g., a general-purpose processor, a PLD, etc.) 1402, a main memory 1404 (e.g., synchronous dynamic random-access memory (DRAM), read-only memory (ROM)), a static memory 1406 (e.g., flash memory and a data storage device 1418), which may communicate with each other via a bus 1430.

Processing device 1402 may be provided by one or more general-purpose processing devices such as a microprocessor, central processing unit, or the like. In an illustrative example, processing device 1402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1402 may also comprise one or more special-purpose processing devices such as an application specific integrated circuit (ASIC), a field programmable gate array (FPGA), a digital signal processor (DSP), network processor, or the like. The processing device 1402 may be configured to execute the operations described herein, in accordance with one or more aspects of the present disclosure, for performing the operations and steps discussed herein. In one embodiment, processing device 1402 represents cloud computing platform 110 of FIG. 1. In another embodiment, processing device 1402 represents a processing device of a client device (e.g., client devices 101-104).

Computing device 1400 may further include a network interface device 1408 which may communicate with a network 1420. The computing device 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse) and an acoustic signal generation device 1416 (e.g., a speaker). In one embodiment, video display unit 1410, alphanumeric input device 1412, and cursor control device 1414 may be combined into a single component or device (e.g., an LCD touch screen).

Data storage device 1418 may include a computer-readable storage medium 1428 on which may be stored one or more sets of instructions, e.g., instructions for carrying out the operations described herein, in accordance with one or more aspects of the present disclosure. Private data exchange instructions 1426 may also reside, completely or at least partially, within main memory 1404 and/or within processing device 1402 during execution thereof by computing device 1400, main memory 1404 and processing device 1402 also constituting computer-readable media. The instructions may further be transmitted or received over a network 1420 via network interface device 1408.

While computer-readable storage medium 1428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "granting," "determining," "publishing," "providing," "designating," "encoding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud). The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   assigning, to a share object, privileges granting access to consumer information obtained from a query against data referenced by a data listing of a data exchange, the data listing provided by a data provider; and
   in response to the share object being added to a list of consumed share objects of the data provider, generating a database that references the consumer information based on the share object.

2. The method of claim 1, wherein the database is read-only.

3. The method of claim 1, wherein the assigned privileges comprise at least one of:
   access to the database and a schema comprising the data listing;
   access to objects within the database and the schema; or
   consumer accounts with which the database and the share object are shared.

4. The method of claim 1, wherein the share object comprises secure joins.

5. The method of claim 1, wherein accessing the share object consumes an amount of user credits.

6. The method of claim 1, wherein the database is an offered service.

7. The method of claim 1, wherein the consumer information includes a consumer identity.

8. The method of claim 1, wherein the consumer information excludes information associated with a specific query executed against the data referenced by the data listing.

9. The method of claim 1, wherein the consumer information includes a list of consumers that have accessed the data referenced by the data listing.

10. A system comprising:
    a memory; and
    a processing device operatively coupled to the memory, the processing device to:
       assign, to a share object, privileges granting access to consumer information obtained from a query against data referenced by a data listing of a data exchange, the data listing provided by a data provider; and in response to the share object being added to a list of consumed share objects of the data provider, generate a database that references the consumer information based on the share object.

11. The system of claim 10, wherein the database is read-only.

12. The system of claim 10, wherein the assigned privileges comprise:
- access to the database and a schema comprising the data listing;
- access to objects within the database and the schema; and
- consumer accounts with which the database and the share object are shared.

13. The system of claim 10, wherein the share object comprises secure joins.

14. The system of claim 10, wherein accessing the share object consumes an amount of user credits.

15. The system of claim 10, wherein the database is an offered service.

16. The system of claim 10, wherein the consumer information includes a consumer identity.

17. The system of claim 10, wherein the consumer information excludes information associated with a specific query executed against the data referenced by the data listing.

18. The system of claim 10, wherein the consumer information includes a list of consumers that have accessed the data referenced by the data listing.

19. A non-transitory computer-readable medium comprising instructions stored thereon which, when executed by a processing device, cause the processing device to:
- assign, to a share object, privileges granting access to consumer information obtained from a query against data referenced by a data listing of a data exchange, the data listing provided by a data provider; and
- in response to the share object being added to a list of consumed share objects of the data provider, generate a database that references the consumer information based on the share object.

20. The non-transitory computer-readable medium of claim 19, wherein the database is read-only.

21. The non-transitory computer-readable medium of claim 19, wherein the assigned privileges comprise at least one of:
- access to the database and a schema comprising the data listing;
- access to objects within the database and the schema; or
- consumer accounts with which the database and the share object are shared.

22. The non-transitory computer-readable medium of claim 19, wherein the share object comprises secure joins.

23. The non-transitory computer-readable medium of claim 19, wherein the instructions further cause accessing the share object to cause consumption of an amount of user credits.

24. The non-transitory computer-readable medium of claim 20, wherein the consumer information includes a consumer identity.

25. The non-transitory computer-readable medium of claim 20, wherein the database is an offered service.

26. The non-transitory computer-readable medium of claim 22, wherein the instructions further cause the consumer information to exclude information associated with a specific query executed against the data referenced by the data listing.

27. The non-transitory computer-readable medium of claim 22, wherein the consumer information includes a list of consumers that have accessed the data referenced by the data listing.

* * * * *